United States Patent
Paiz

(12) 
(10) Patent No.: US 6,842,511 B1
(45) Date of Patent: Jan. 11, 2005

(54) PARALLEL COMPUTER NETWORK AND METHOD FOR TELECOMMUNICATIONS NETWORK SIMULATION TO ROUTE CALLS AND CONTINUOUSLY ESTIMATE CALL BILLING IN REAL TIME

(76) Inventor: Richard S. Paiz, 16558 NE. 26th Ave., Apt. 2-F, North Miami Beach, FL (US) 33160

( * ) Notice: Subject to any disclaimer, the term of this patent is extended or adjusted under 35 U.S.C. 154(b) by 29 days.

(21) Appl. No.: 10/603,963

(22) Filed: Jun. 25, 2003

Related U.S. Application Data

(63) Continuation-in-part of application No. 09/544,238, filed on Apr. 7, 2000, now Pat. No. 6,614,893.
(60) Provisional application No. 60/184,537, filed on Feb. 24, 2000.

(51) Int. Cl.[7] .............................................. H04M 15/00
(52) U.S. Cl. .............................. 379/115.01; 379/115.02; 379/121.01; 379/126
(58) Field of Search ............................ 379/219, 220.01, 379/221.01, 221.06, 221.07, 115.01, 115.02, 121.01, 126, 120, 114.01; 455/405, 406

(56) References Cited

U.S. PATENT DOCUMENTS

| | | | | |
|---|---|---|---|---|
| 5,832,069 A | * | 11/1998 | Waters et al. | 379/115.01 |
| 5,878,127 A | * | 3/1999 | Fleischer, III | 379/221.08 |
| 5,910,981 A | * | 6/1999 | Bhagat et al. | 379/219 |
| 5,917,899 A | * | 6/1999 | Moss et al. | 379/221.08 |
| 6,028,924 A | * | 2/2000 | Ram et al. | 379/229 |
| 6,078,657 A | * | 6/2000 | Alfieri et al. | 379/220.01 |
| 6,128,378 A | * | 10/2000 | Diener et al. | 379/221.01 |
| 6,445,785 B1 | * | 9/2002 | Chan et al. | 379/221.13 |
| 6,490,345 B2 | * | 12/2002 | Fleischer et al. | 379/114.01 |
| 6,542,598 B2 | * | 4/2003 | Fleischer et al. | 379/211.02 |
| 2003/0215073 A1 | * | 11/2003 | Culli et al. | 379/121.01 |

* cited by examiner

*Primary Examiner*—Rexford Barnie
(74) *Attorney, Agent, or Firm*—Gold & Rizvi, P.A.; Glenn E. Gold; H. John Rizvi

(57) ABSTRACT

A telecommunications call routing and billing computer system includes a telecommunications network including a junction point including a call routing switching device, and including two call routing links meeting at the junction point and in communications with each other through the call routing switching device; and a call routing simulation network including a junction point simulation computer located at the junction point and in communication with the call routing switching device and the two call routing links.

11 Claims, 38 Drawing Sheets

Calling Party Leg A
305 948 1234
NPA-NXX-EXTN

Called Party Leg B
305 938 5678
NPA-NXX-EXTN

Calling Party request dial tone and then the subscriber dials
305 938 5678
An (IAM) messages is sent as the CO determines that 305 938 5678 is doesn't belong to its
Own domain. The HQO searches and determines that HQ1 is the most probable owner. HQO upon receiving the IAM messages creates a SSN and then send a HBS_Vector_CDR message to TO#8 IC. When the ANM or ACM message is received an Update_Vector_CDR message is generated and the HBS_Vector CDR is futher updated. Then a REL A or REL_B message is received an a Release_Vector_CDR message is generated and HBS_Vector_CDR is futher updated. No Tandem data. EX 113108-03-07.
VectorTrajectory Update
CO#3 113##-03-## via forward chaining (FC) IAM message
TO#8 11308-03-## via forward chaining(FC) IAM
Message
CO#7 11308-03-07 via backward chaining (BC) ACM message If no synergy exist and lateral integration among the components does not apply then 5,000 excess records are sent to the HQ3.
The HBS move and shift resources for maximun efficiency, thus a 5,000.
Buffer exist which is used to remove the 5,000 excess.

0. Leg A dials 011 39## ##
1. Call is considered connected

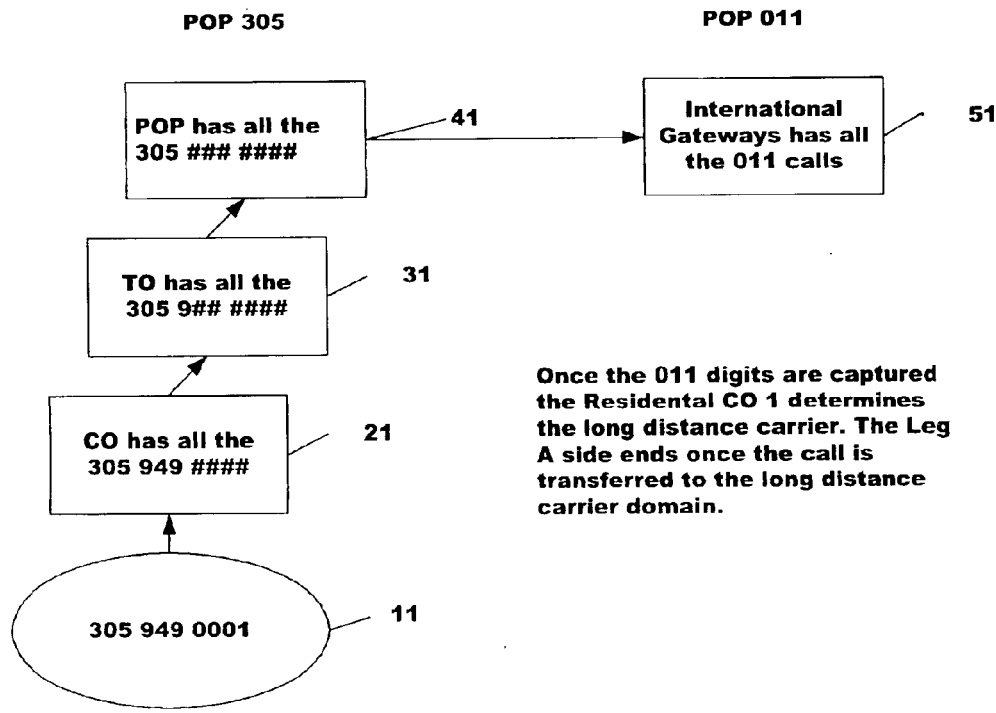

When Leg A or Leg B go on-hook three CDR are generated. One CDR for the International Gateway (POP) one for the exchange Central Office, and the Residential CO originating the call.

Note: Domestic long distance calls will behave in the same manner as International Long Distance calls.
Calls within the Bell South domain that are routed to other networks will possess 2 CDR if within
the same NPA. Otherwise the call will have 3 to 5 CDR. For simplicity the average of four CDR has been used.

Fig. 14

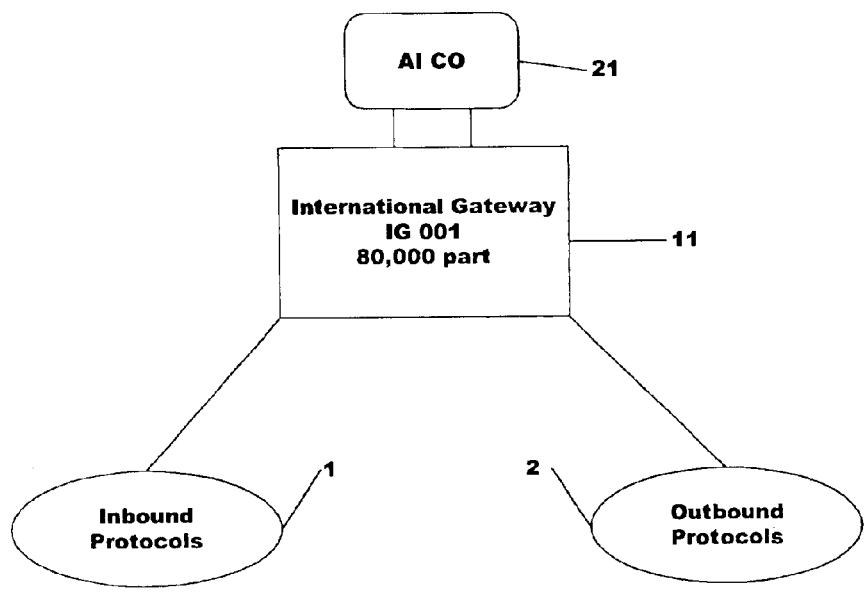

Every minute up to 15,000 CDR are processed. The AI component scans the environment every second.(Genesis Engine Foot Soldier)
Every 5 seconds a new fuzzy state cycle begins.
Every time a new billable entity is generated the AI CO analyses the Trunk information, Leg A and Leg B information to properly rate the call.
For every billable entity the CO generates a unique ID.
 Example IG 001########.
When the CDR containing the end time of the call is received the system is able to complete the billable entity. At this point the information is sent to the billing engine

Fig.15

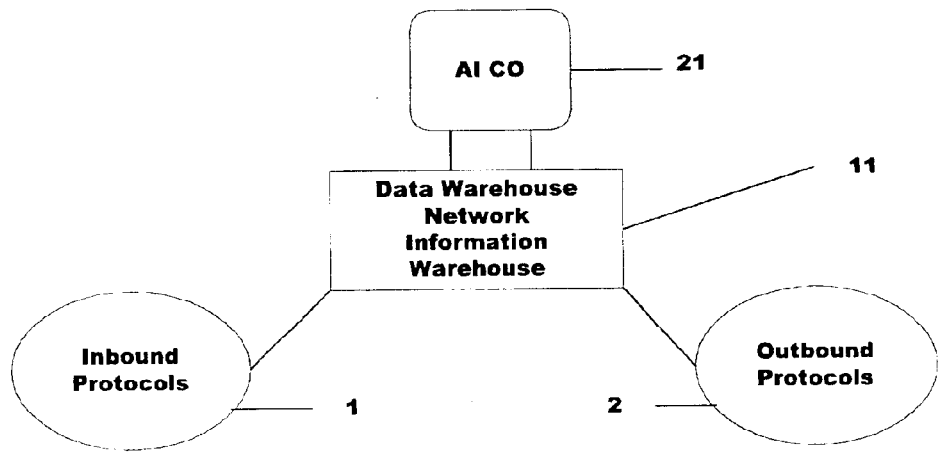

Every minute up to the rated limit of CDR are processed.
The AI component scans the environment every second.
Every 5 seconds a new fuzzy state cycle begins.
Every time a new billable entity is generated the AI CO
analyses the trunk information, Leg A and Leg B information
to properly rate the call.
Every minute, and in each binary time interval the Data
Warehouse receives updates from its hierarchy and other
IDW/ INIW to determine system integrity and immediately
identifies potential churn subscribers.
Provisioning statistics as well as trending are the key
Component of this Data Warehouse that also is an IC.

Fig.16

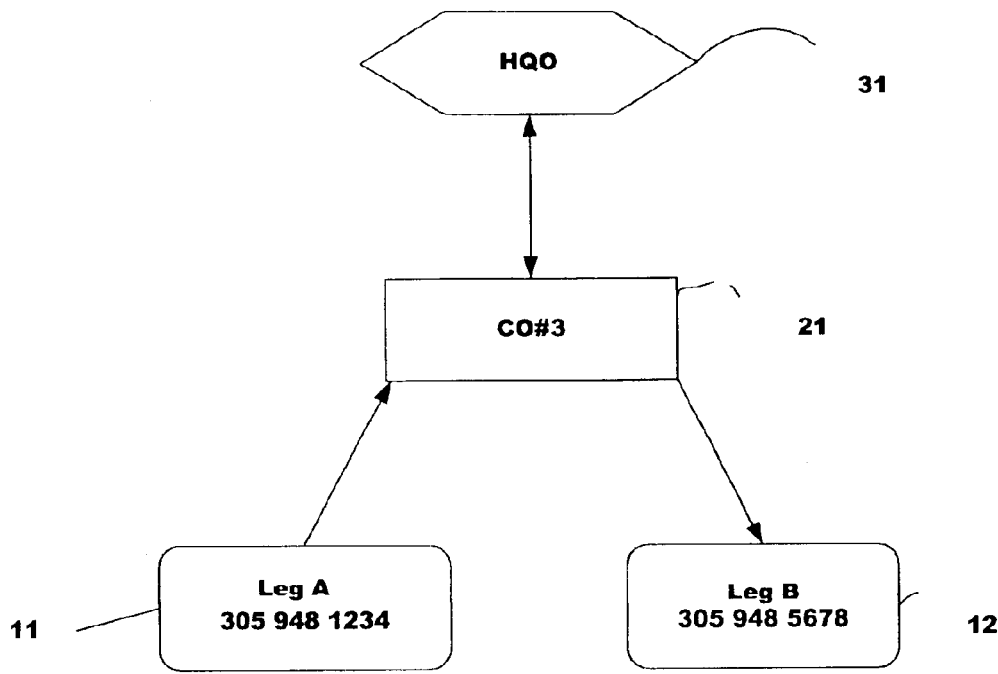

| HQ6 | 1 | |
| HQ5 is BST | 1 | HQ2 is Miami 4 |
| HQ4 is Florida | 1 | HQ1 is Miami 8 |
| HQ3 is S.Fla | 3 | |
| Leg A is 11134803 | | Leg B is |
| 11134803 | | |

CO 1134803 initiates the call.
CO 1134803 Owns and generates the Vector CDR.
1 CDR must be correlated to make the billing entity.
Vector Magnitude looks like this 1134803 (Owner)
N/A (Leg A CO) N/A (Leg B CO) 1134803
The unique ID for the call would be 1134803########

1134803aaaa0000000000. Four letters and 0-16,777,216 range.
This would be the first call this specific switch could possibly perform.

Fig.17

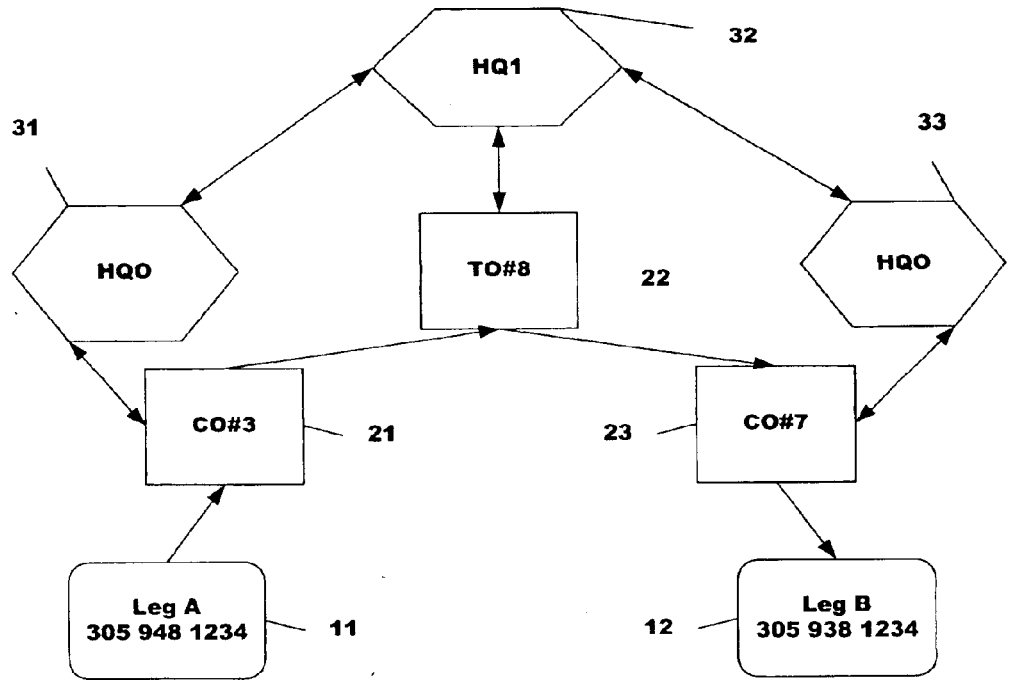

| | | | |
|---|---|---|---|
| HQ 5 is BST | 1 | HQ2 is Miami | 4 |
| HQ4 is Florida | 1 | HQ1 is Miami | 8 |
| HQ3 is S. Fla | 3 | | |
| Leg A is 1134803 | | Leg B is 1134807 | |

CO 1134803 initiates the call. CO 11348 ows the call
And generates the Vector CDR. 3 CDR must be
Correlated to make the billing entity.
Vector Magnitude looks like this 11348 (Owner)
03 (Leg A CO ) 07 (Leg B CO) 11348-0307
The unique ID for the call would be 1134803 ########
1134803aaaa0000000000.Four letters and 016,777,216
range. This would be the first call this specific switch
could possibly perform.

Fig.18

| | | | |
|---|---|---|---|
| 305-9490001 | | 305 443 2354 | |
| North Miami Beach | | Coral Gables | |
| HQ6 | | 1 | |
| HQ5 BST | 1 | HQ1 Leg A | 8 |
| HQ4 Florida | 1 | HQ 1 Leg B | |
| 7 | | | |
| HQ3 S. Fla | 3 | | |
| HQ2 Miami | 4 | | |

Leg A is 11134803          Leg B is 1113470F
CO 1134803 initiates the call. CO 1134 owns the call and generates the Vector CDR. HQ2. At least 4 CDR must be correlated to make the billing entity.

Vector Magnitude looks like this: 1134 (Owner) 803 (Leg A CO) 70F (Leg B CO) 1134-803-70F

| 305-9490001 | | 407 671 9999 | |
|---|---|---|---|
| Miami | | Orlando | |
| HQ5 BST | 1 | Leg A | 4 |
| HQ4 Florida | 1 | HQ2 Leg B | 1 |
| HQ3 S. Fla | 3 | HQ 1 Leg A 8 | |
| HQ1 LEGB | 7 | | |

Leg A is 1134803  Leg B is 1131701
CO 1134803 initiates the call. CO 113 owns the call and
generates the Vector CDR. HQ3. At least 6 CDR must
be correlated to make the billing entity.

Vector Magnitude looks like this: 113 (Owner) 4803
(Leg A CO) 1101 (Leg B CO) 113-4803-1101

305-9490001　　　　　　　407 671 9999
Miami　　　　　　　　　　Jacksonville
HQ6　　　　　1
HQ5 BST　　　1　　　　　HQ3 Leg A　　3
HQ4 Florida　　　　1　　　　HQ3 Leg B　　　2
HQ2 Leg A　　4　　　　　HQ1 Leg A　　8
HQ2 Leg B　　1　　　　　HQ1 Leg B　　1

Leg A is 11134803　　　　　Leg B is 11121105
CO 1134803 initiates the call. CO 11 owns the call and
generates the Vector CDR. HQ4. At least 6 CDR must
be correlated to make the billing entity.

Vector Magnitude looks like this: 11 (Owner) 34803
(Leg A CO) 21105 (Leg B CO) 11-34803-21105

| 305-525-0001 | | 404-777-1234 | |
| --- | --- | --- | --- |
| Miami | | Atlanta | |
| HQ6 | 1 | | |
| HQ5 BST | 1 | HQ5 BST | 1 |
| HQ4 Florida | 1 | HQ4 Georgia | 2 |
| HQ3 SFla | 3 | HQ3 N Geo | 1 |
| HQ2 | 4 | HQ2 | 1 |
| HQ1 | 7 | HQ1 | A |
| Leg A is 11134707 | | Leg B is 11211A03 | |

305 525 0001  
Miami  
HQ5 BST     1  
HQ4 Florida    1  
HQ3 S. Fla     3  
HQ2            4  
HQ1            7

011502261324  
Guatemala  
HQ5   AT&T     1

Leg A is 1134707     Leg B is out of the domain.
CO 1134807 initiates the call. HQ6* owns the call and
Generates the Vector CDR. At least 3 CDR must be
correlated to make the billing entity.##### International
Regional (CLEC) # Local (CLEC). CLEC the
subscriber belongs to another network.
Vector Magnitude looks like this: 1 (Owner) 134707

Calling Party Leg A
305 948 1234
NPA-NXX-EXTN

Called Party Leg B
305 948 5678
NPA-NXX-EXTN

Calling Party request dial tone and then the subscriber dials
305 948 5678#

| | | | |
|---|---|---|---|
| HQ6 | 1 | | |
| HQ5 is BST | 1 | HQ2 is Miami | 4 |
| HQ4 is Florida | 1 | HQ1 is Miami | 8 |
| HQ3 is S.Fla | 3 | | |
| Leg A is 11134803 | | Leg B is | |
| 11134803 | | | |

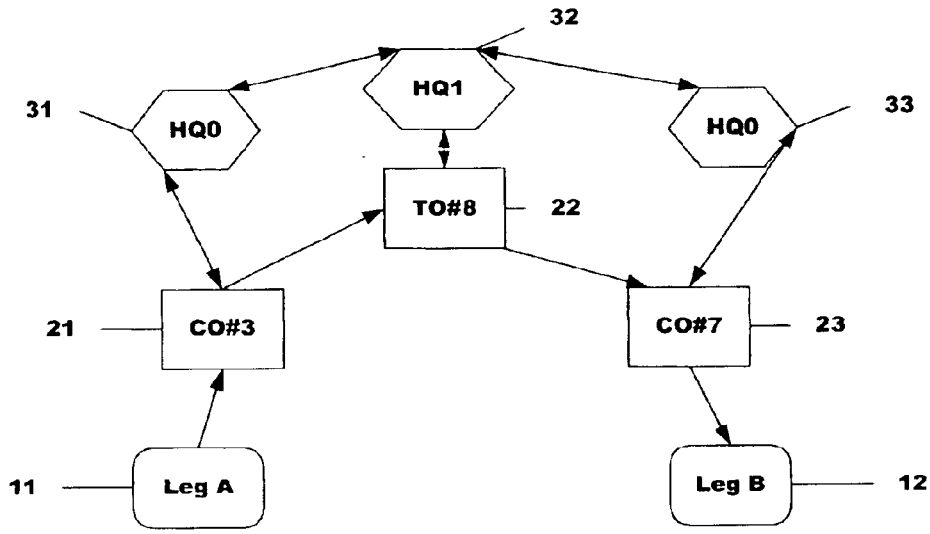

Calling Party Leg A
305 948 1234
NPA-NXX-EXTN

Called Party Leg B
305 938 5678
NPA-NXX-EXTN

Calling Party request dial tone and then the subscriber dials
305 938 5678

An (IAM) messages is sent as the CO determines that 305 938 5678 is doesn't belong to its
Own domain. The HQO searches and determines that HQ1 is the most probable owner. HQO upon receiving the IAM messages creates a SSN and then send a HBS_Vector_CDR message to TO#8 IC. When the ANM or ACM message is received an Update_Vector_CDR message is generated and the HBS_Vector CDR is futher updated. Then a REL_A or REL_B message is received an a Release_Vector_CDR message is generated and HBS_Vector_CDR is futher updated. No Tandem data. EX 113108-03-07.
VectorTrajectory Update
CO#3 113##-03-## via forward chaining (FC) IAM message
TO#8 11308-03-## via forward chaining(FC) IAM
Message
CO#7 11308-03-07 via backward chaining (BC) ACM message

Fig.25

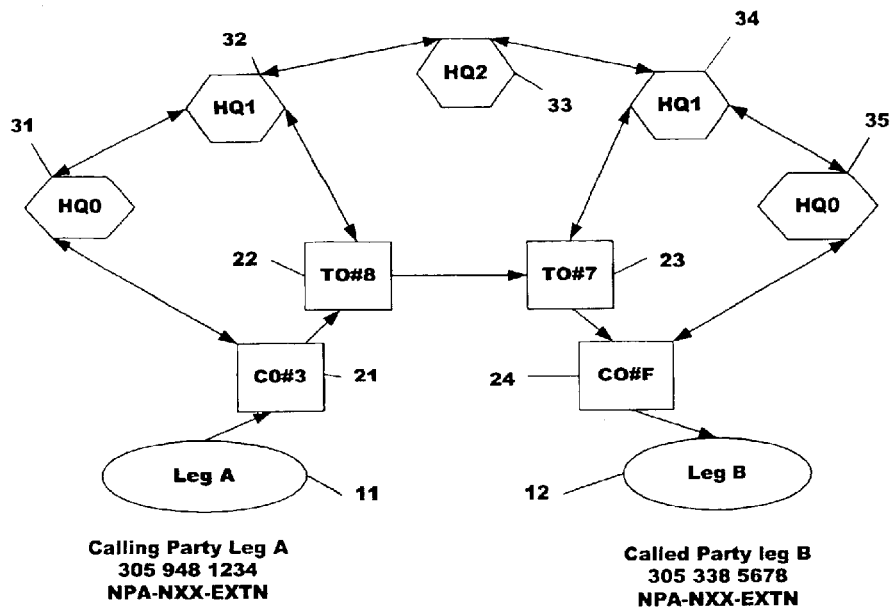

Calling Party Leg A
305 948 1234
NPA-NXX-EXTN

Called Party leg B
305 338 5678
NPA-NXX-EXTN

Calling Party request dial tone and then the subscriber dials 305 338 5678#

An (IAM) messages is sent as the CO determines that 305 338 5678 is doesn't belong to its own domain. The HQO searches and determines that HQ2 is the most probable owner.
HQO upon receiving the IAM messages creates a SSN and then send a HBS_Vector_CDR message to TO#8 IC, POP #4 IC, TO#7 IC, CO#OF IC. When the ANM or ACM message is received an Update_Vector_CDR message is generated and the HBS_Vector_CDR is further updated. Then a REL_A or REL_B message is received an a Release_Vector CDR message is generated and HBS_Vector _CDR is futher updated. No Tandem data. Ex 1134 -###-### Vector Trajectory Update.

| | | |
|---|---|---|
| CO#3 | 1134-#03-##- | IAM(FC) Calling Party (Leg A ) Owner |
| TO#8 | 1134-803-##- | IAM (FC) |
| POP#4 | 1134-803-##- | IAM (FC)HQ2 Miami, FLA(Dade County NPA) Vector Owner |
| TO#7 | 1134-703-7-##- | IAM (FC) |
| CO#F | 1134-703-7OF- | ACN (BC) Called Party (Leg B) Owner. |

Fig.26

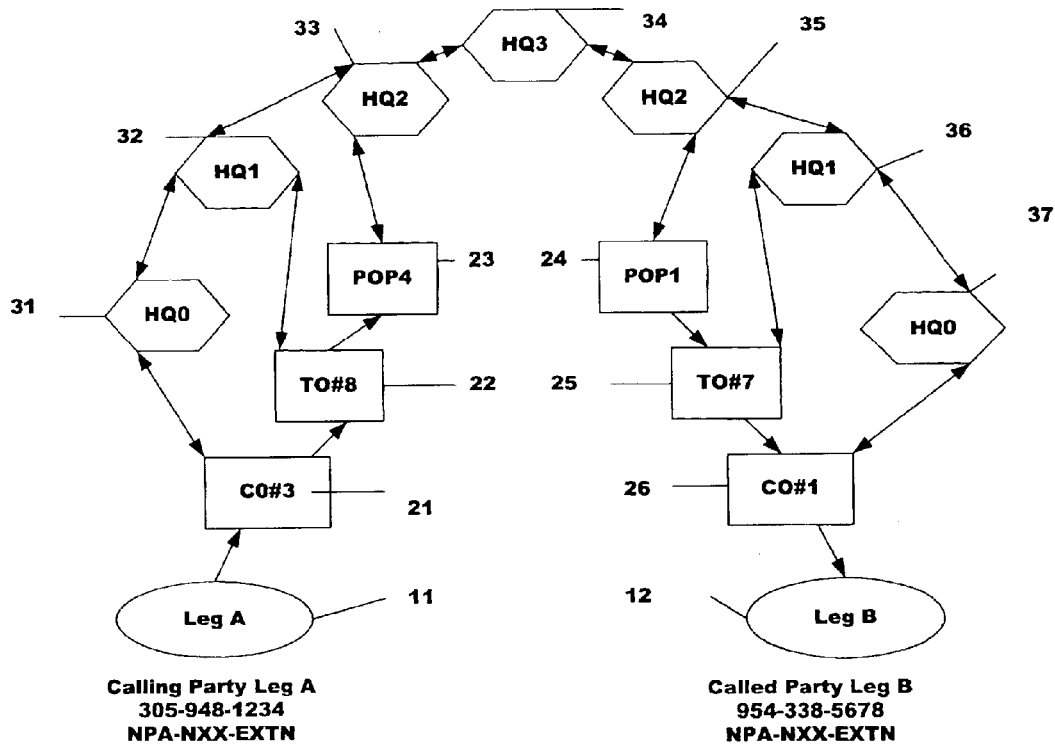

Calling Party Leg A
305-948-1234
NPA-NXX-EXTN

Called Party Leg B
954-338-5678
NPA-NXX-EXTN

Calling party request dial tone and then the subscriber dials 954 338 5678

An (IAM) messages is sent as the CO determines that 954 3385678 is doesn't belong to its own domain. The HQ0 searches and determines that HQ# is the most probable owner.
HQ0 upon receiving the IAM messages creates a SSN and then send a HBS_Vector_CDR message to TO#8 IC, POP#4 IC, POP#1 IC, TO#7 IC, CO#1 IC. When the ANM or ACM message is received an Update_Vector_CDR message is generated and the HBS_Vector_CDR is further updated. Then a REL_A or REL_B message is received an a Release_Vector_CDR message is generated and HBS_Vector_CDR is further updated. No Tandem data EX .
113-####-####
Vector Trajectory Update

| | | |
|---|---|---|
| CO#3 | 113-##03-###- | IAM (FC) Calling Party (Leg A) Owner |
| TO#8 | 113-#803-###- | IAM (FC) |
| POP#4 | 113-4803-1###- | IAM(FC) HQ3 South Florida Lata Vector Owner |
| POP#1 | 113-4803-1###- | IAM(FC) |
| TO#7 | 113-4803-17##- | IAM(FC) |
| CO# | 113-4803-1701- | ACN (BC) Called Party (Leg B) Owner |

Fig.27

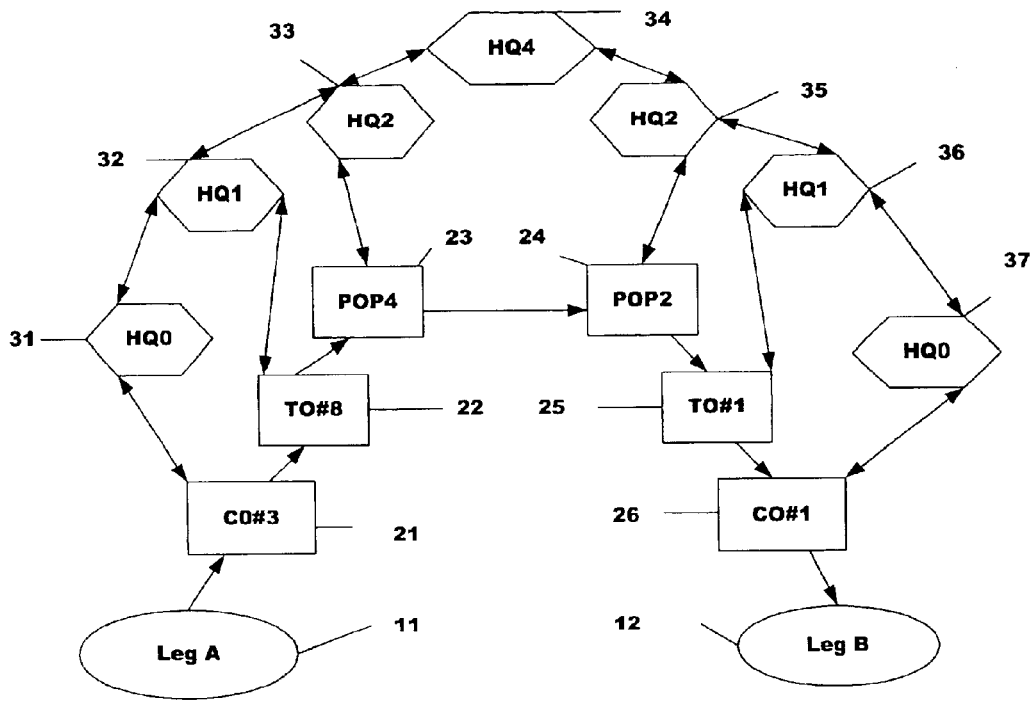

Calling Party request dial tone and then the subscriber dials 904 777 5678#.
***This call has a Tandem POP connection between POP#4 and POP#2.
An (IAM) messages is sent as the CO determines that 9047775678 is doesn't belong to its own domain. The HQO searches and determines that HQ4 is the most probable owner.
HQO upon receiving the IAM messages creates a SSN and then send a HBS_Vector_CDR message to TO#8 IC, POP#4 IC, POP#2 IC, TO#1 IC, CO#1 IC. When the ANM or ACM message is received an Update_Vector_CDR message is generated and the HBS_Vector_CDR is further updated. Then a REL_A or REL_B message is received an a Release_Vector_CDR message is generated and HBS_Vector_CDR is futher updated. EX 11-####-####-X- Vector Trajectory Update.

| | | |
|---|---|---|
| CO#3 | 11-###03-#### | IAM(FC) Calling Party (Leg A) Owner |
| TO#8 | 11-##803-### | IAM(FC) |
| POP#4 | 11-34803-### | IAM(FC) HQ4 Florida Domain Vector Owner |
| PTO#X | 11-34803-###-X- | IAM(FC) |
| POP#2 | 11-34803-22###-X- | IAM(FC) |
| TO#1 | 11-34803-221##-X- | IAM(FC) |
| CO#1 | 11-34803-22101-X- | ACN(BC)Called Party (Leg B) Owner. |

Fig.28

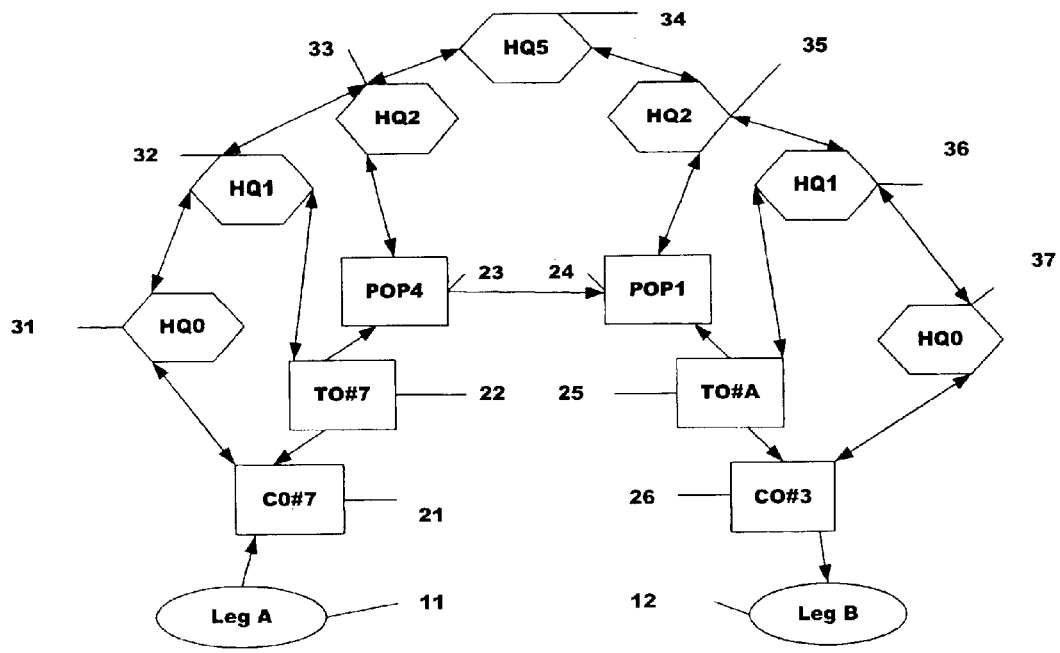

Calling Party request dial tone and then the subscriber dials 404 7775678#.
***This call has a Tandem POP connection between POP#4 and POP#2.
An (IAM) messages is sent as the CO determines that HQ5 is the most probable owner.
HQO upon receiving the IAM messages creates a SSN and then send a HBS_Vector CDR message to TO#8 IC, POP#4 IC, POP#2 IC, TO#1 IC, CO#1 IC. When the ANM or ACM message is received an Update_Vector_CDR message is generated and the HBS_Vector_CDR is futher updated. Then a REL_A or REL_B message is received and a Release_Vector_CDR message is generated and HBS_Vector_CDR is further updated. EX 11-####-####-X-.
Vector Trajectory Update.

| | | |
|---|---|---|
| CO# 3 | 1-13##03-######- | IAM (FC) Calling Party (Leg A) Owner. |
| TO#8 | 1-13#803-######- | IAM (FC) |
| POP#4 | 1-134803-######- | IAM (FC) HQ5 BST Domain Vector Owner. |
| PTO#X | 1-134803-#####-x- | IAM (FC) |
| POP#2 | 1-134803-21####-x- | IAM (FC) |
| TO#1 | 1-134803-2121##-x- | IAM (FC) |
| CO#1 | 1-134803-211101-X- | ACM (BC) Called Party (Leg B) Owner. |

Fig.29

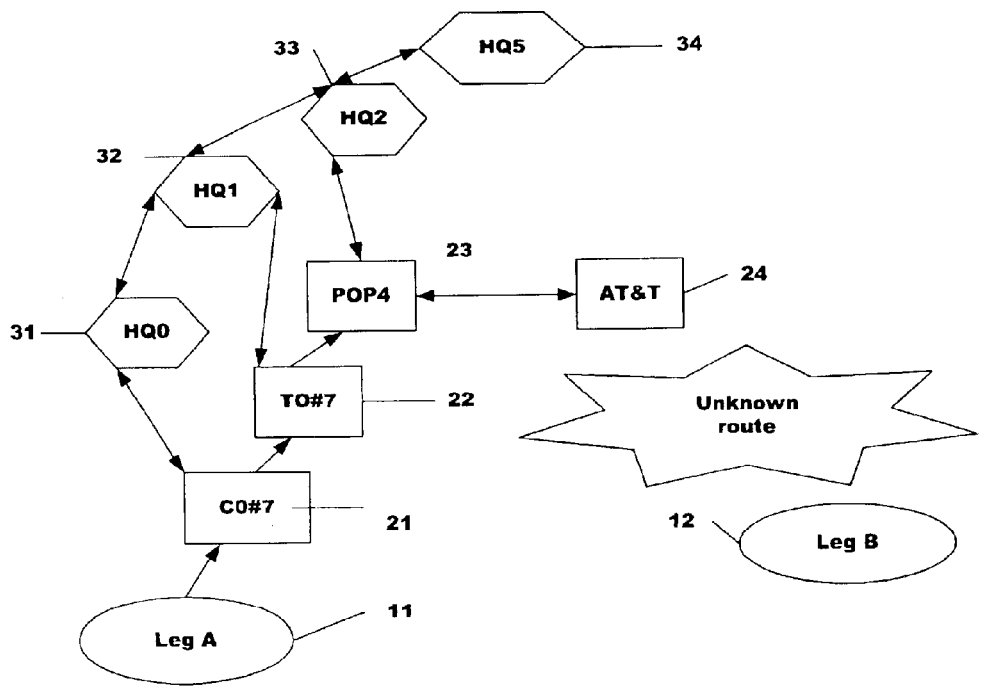

Calling Party Leg A
305-948-1234
NPA-NXX-EXTN

Called Party Leg B
011-5022-1324
INT-CC-EXTN

Calling Party request dial tone and then the subscriber dials 011502261324#.
An (IAM) messages is sent as the CO determines that 011 5022 61324 is an
international call and must be routed to AT&T. The HQ0 searches and determines that
HQ5 is the most probable owner.HQ0 upon receiving the IAM message3s creates a SSN
and then send a HBS_Vector_CDR message to TO#8 IC, POP#4 IC. When the ANM or
ACM message is received an Update_Vector_CDR message is generated and the
HBS_Vector_CDR is further updated.
Then a REL_A or REL_B message is received an a Release_Vector_CDR message is
generated and HBS_Vector_CDR is further updated.EX 1~13####~
Vector Trajectory Update
CO#3    1~13##03~         IAM (FC) Calling Party (Leg A) Owner
TO#8    1~13#803~         IAM (FC)
POP#4   1~134803~         IAM (FC) HQ5 BST Domain International Call When Leg B doesn't belong to the BST domain it is possible that the owning Vector HQ
may adjust the vector trajectory.
Example a Call start from a Leg A owner which belongs to a CLEC but uses BST
network.

Fig.30

Legend:
10: System
20: Simulation Network
24: Process Power Support Computers
26: Parent Simulation Computers
28: User Interface Computers.
30: Telecommunications Network
32: Junction point Simulation Computer
34: Telecommunication Network Junction Point Computers

PARALLEL COMPUTER NETWORK AND METHOD FOR TELECOMMUNICATIONS NETWORK SIMULATION TO ROUTE CALLS AND CONTINUOUSLY ESTIMATE CALL BILLING IN REAL TIME

CROSS REFERENCE TO RELATED APPLICATIONS

This application is a continuation-in-part of patent application Ser. No. 09/544,238, filed Apr. 7, 2000, now U.S. Pat. No. 6,614,893 which relates to the same subject matter as provisional patent application Ser. No. 60/184,537, filed by the same inventor on Feb. 24, 2000. This application claims the Feb. 24, 2000 and Apr. 7, 2000 filing dates as to the respective common subject matter.

BACKGROUND OF THE INVENTION

1. Field of the Invention

The present invention relates generally to the field of computer networks, data accessing and processing systems. More specifically the present invention relates to a system of computers linked into a neural simulation network, or hive, with neural elements at remote sites which mimics and is placed in parallel operation, switch by switch, with an existing call routing telecommunications network to simulate the operation of the telecommunication network. The simulation network plots a call routing vector by forwardly chaining vector links through the simulation network and relaying as a response, or echo, the vector information so that the call is placed through the telecommunications network with maximum efficiency of bandwidth usage and computer capacity. Assume, for example, that the average call has seven call detail records (CDR). The present system correlates the billing entity locally, so that the system finds and sends only the one real CDR that the system has determined to have all the valid call components. The remaining six CDRs are thereby eliminated locally and are not transmitted to a central computer since they are redundant, and six sevenths, or 86 percent of bandwidth is saved.

Thus the routing vector determines which telecommunications provider will own the call and thus determines the billing rate for the call, the rate information being incorporated into the call routing vector data. The billing rate is estimated from the moment the call is initiated, and the accuracy of the estimate increases as the call progresses so that billing takes places in real time. This billing method is known as a "fuzzy system" because it takes partial data samples and continuously projects an estimated total in real time. The more data exchanged through system messages that is through chaining, the more accurate the extrapolation becomes, until it reaches one hundred percent accuracy. The interactive simulation creates a data warehouse virtual environment.

2. Description of the Prior Art

There have long been individual computers loaded with programs for routing telephone calls and generating billing for telephone and electrical utilities, which rely upon the processing power and data within the single computer. A problem with these single computer applications has been that more processing power and data access capability are needed, as well as increased bandwidth usage, together with web and virtual world access. Another related problem is that billing is not done in real time, which particularly complicates debiting of calling cards. Solutions to these problems are presented in the published doctoral dissertation of the present inventor, entitled *Designing Hot billing Systems for Large Volume and or Complex Network*, submitted for the degree of Doctor of Philosophy in Management for the present inventor at California Coast University in November of 1999, the entire contents of which are incorporated by reference. Also incorporated by reference are the contents of a provisional patent application filed by the present inventor on Feb. 24, 2000, Ser. No. 60/184,537, entitled Intelligent Component Billing System.

U.S. Pat. No. 5,878,113, issued to Bhusri on Mar. 2, 1999, discloses an exemplary telecommunications system that relies upon the operation of a single, central computer. The '113 patent discloses a system for service control and operations for a telecommunication network, wherein the system communicates with a plurality of interconnected telecommunications network elements via a switching and signaling subsystem. The system provides and controls the various functions of the telecommunications network, such as call processing and routing, automatic fault detection and correction, interactive provision of services to customers, fraud detection and control, identification of patterns of network abuse, data collection of call activity at each network and network element, production of a data record for each network element, and production of a data record for each call placed within the network. To accomplish the aforementioned tasks, Bhusri relies upon a centralized mainframe computer. Consequently, the system disclosed by Bhusri is inherently susceptible to system faults, overloads and bottlenecks, since it is highly dependent upon the operation of the single central computer.

U.S. Pat. No. 5,774,532, issued to Gottlieb et al. on Jun. 30, 1998, discloses a telecommunications system incorporating a concentrator, or centralized mainframe computer, in which call records are generated from various network elements processing a call. A consolidation feed acts as a concentrator for the various records. However, since the concentrator receives the call records at different times, the invention provides the concentration with a count of different network elements that have to process the call. This allows the concentrator to match and merge the records after all of the records indicated in the final count have been received. In order to maintain the count, a buffer count is updated through the elements of the network used to build the call. As the volume of calls increases, the amount of duplicate data grows geometrically. Consequently, the centralized mainframe becomes increasingly susceptible to data congestion. Furthermore, the redundancy of the system does not enable real-time activities, such as billing and fraud detection.

U.S. Pat. No. 5,949,875, issued to Walker et al on Sep. 7, 1999, discloses a billing and collection system comprising an access management computer enabling payment, for a service provided over a data network, to be made for a telephone connection to a shared revenue billing network wherein the telephone connection to the billing network regulates access to the service provided over the data network. Walker discloses a system incorporating multiple computers each having specific functions. However, Walker discloses a centralized system in which multiple gathering computers having specific functions assist in processing information for a centralized mainframe computer. Walker does not disclose a vector-based system enabling the performance of real-time functions such as real-time billing and fraud detection.

U.S. Pat. No. 5,802,145, issued to Farris et al on Sep. 1, 1998, discloses a system and method for utilizing a common signaling network controlling a communications system for detecting predetermined events, executing predetermined events, and preventing a predetermined script upon detection of said events. This is accomplished strictly by building an SS7 vector route as the call travels through the different STP network elements. The monitors are programmed to trap and temporarily record predetermined data associated with specific events intended to be blocked or controlled. Therefore, Farris discloses a vector-based system enabling certain real-time activities. Specifically, the system is directed for use in providing real-time fraud detection and real-time detection of other predefined events. However, the system disclosed by Farris is not designed for, and does not enable, real-time billing or data manipulation to create a billable entity.

U.S. Pat. No. 5,768,352, issued to Elliott et al. on Jun. 16, 1998, discloses a system in which data incorporated in call detail records (CDRs), obtained from network switches, are subjected to processing by a statistics engine which maintains separate counts for CDR events relating to certain calls, such as 800 number and 900 number calls. Although Elliott discloses a system enabling real-time function, it is limited to a generalized statistical engine and thus does not include functionality necessary for real-time billing, fraud detection and comprehensive report generation summarizing the flow of funds.

Accordingly, there is an established need for a telecommunications system overcoming the drawbacks and limitations of the prior art.

In one aspect of the invention, a computer network system is provided that parallels and simulates an existing organization possessing a telecommunications network, so that the system does not tax the capacity of the existing network.

In another aspect of the present invention a computer network system is provided which plots and updates a call routing vector for each call through forward chaining of vector links, and relays the vector information to the telecommunication network through rearward chaining for placement of all calls. The system determines routing vectors for all calls, whether individually or for clusters of calls, from point A to point B and monitors and changes the vector as necessary to avoid a network trouble area or to maximize available bandwidth usage. Thus, the system analyzes, monitors and assigns a vector to each call that occurs in the telecommunications network. Furthermore, each node of the system has the latest real time network traffic patterns and conditions, enabling the nodes to make informed network traffic decisions.

In another aspect of the present invention the computer network system plots a call routing vector providing the lowest billing rate available for that call at that moment and contains pricing data so that billing begins at the moment a call is initiated and continues in real time as the call progresses.

In another aspect of the present invention the simulation network minimizes bandwidth usage by performing call routing calculations at individual junction points within the telecommunications network and sending only summarized information packets over network links.

In another aspect of the present invention, a network system is provided that maximizes telecommunications network processing power by shunting calls from computers momentarily operating at or near capacity, and thus having smaller buffers, to less taxed computers having larger buffers.

In another aspect of the present invention, the network system operates in conjunction with antiquated telecommunications technology, so that existing equipment is not wasted and the cost of updating/upgrading is minimized.

In another aspect of the present invention, the network system performs network trouble-shooting functions aimed at minimizing down time and platform failure, by substantially immediately warning a repair crew of the nature and location of a problem. Preferably, in this manner, system integrity is maintained via a proactive preventative maintenance program.

In another aspect of the present invention, the network system is relatively redundant and inexpensive to assemble and operate.

SUMMARY OF THE INVENTION

The present invention accomplished the above-stated objectives, as well as others, as may be determined by a fair reading and interpretation of the entire specification.

A telecommunications call routing and billing computer system is provided, including a telecommunications network including a junction point, including a call routing switching device, and including two call routing links meeting at the junction point in communication with each other through the call routing switching device, and a call routing simulation network including a junction point simulation computer located at the junction point and in communication with the call routing switching device and the two call routing links.

The call routing switching device is typically a telecommunications network computer. The telecommunications network typically includes a large number of the junction points, each including a call routing switching device, and each call routing switching device is connected to two call routing links which connect to other junction points; and the call routing simulation network typically includes a large number of the junction point simulation computers, each located at one of the junction points and in communication with the switching device at the given junction point and with the call routing links at the given junction point.

A call routing and billing computer system is further provided for use in combination with a telecommunications network having a number of call junction points including call routing switching devices interconnected by call routing links, the telecommunication call routing and billing computer system including a simulation network including a number of junction point simulation computers networked to each other to function as a unit and to define a data warehouse virtual environment, each junction point simulation computer having its own location identification indicia, one of the junction point simulation computers being located at each of several of the call junction points to make switching decisions at each call junction point; the simulation network having computer programming to simulate the operation of the telecommunications network for each call placed through the telecommunications network by forward chaining of the call through the simulation network from the point of call origin to the point of call destination to determine all of the links making up a routing vector for the call and to determine misuse of the resources, and by rearward chaining of routing vector information through the simulation network to the point of call origin.

The simulation network preferably includes at least one parent simulation computer synchronizing and delegating tasks among a number of the junction point simulation computers. The simulation network preferably includes a hierarchy of parent simulation computers, each parent simulation computer synchronizing and delegating tasks among simulation computers lower in the hierarchy. Each call junction point typically includes a telecommunications network call routing switch. Each call junction point preferably includes a simulation network call routing switch. The hierarchy of simulation computers preferably additionally includes at least one dedicated computer for performing a specific task, and at least one processing computer for providing processing power to the unit. The simulation network may deliver summaries of routing information in the form of reports to a user computer terminal.

The forward and rearward chaining preferably determines and relays estimated billing information to the telecommunications network as a call is placed in substantially real time. The junction point simulation computer location identification indicia each preferably include an identification number. The unit preferably is linked to a human user computer terminal. The system optionally additionally includes a strategy execution program which, stores parameters input by a human user for generation of certain commands in the events that data received from the virtual environment produces indicia meeting one of the parameters. The unit preferably additionally computes a bill for each call and generates a billing statement for delivery to the user. The links preferably include direct hyperlinks.

A method is provided of placing a call through such a telecommunications network, including the steps of: placing one junction point simulation computer at each telecommunications network call junction point; for each call placed with the telecommunications network, plotting a call routing vector through the simulation network with forward chaining through the junction point simulation computers; and sending routing vector information back through the simulation network with rearward chaining to direct the call along a parallel routing vector through the telecommunication network.

The method preferably includes the additional steps of: monitoring buffer levels of telecommunications network junction point computers with the simulation computer at each junction point; and using the buffer level information to shunt calls from telecommunications networks junction point computers having smaller buffers to telecommunications network junction point computers having larger buffers. The method preferably includes the further step of: selecting a call provider offering the lowest rates during the forward and rearward chaining. The method preferably includes the still additional steps of: performing at every binary time interval a network diagnostic of the entire simulation network, and thus of the telecommunications network to detect system failure; and plotting new call routing vectors upon detection of a system failure which avoid the system failure, and can modify central office switches and change the route, thereby plotting new trajectory calls with real time data. Furthermore, it can also programmably modify route tables, trunk tables, add and remove users, and block, listen to or monitor and calls for security reasons. The hive simulation computers call each other to make sure the system is fully integrated. Placement of these calls is triggered by detected routing problems, and further user calls are then blocked where required. Thus we are optimizing the system for performance. In addition, each local data warehouse has the conditions and route patterns of the entire network. And with this information every time a call is initiated, the local hives know the exact routes of each specific call that goes through.

In a further aspect of the present invention, particularly for use with a telecommunications network incorporating a plurality of call carrier billing entities, a method is provided for gathering and converting multiple independent billable segments of a telephone call into corresponding billing components for communication to a designated call owner in a manner enabling the call owner to effect billing immediately upon termination of the telephone call, but prior to network generation of billing component CDRs. Preferably, the telecommunications network covers a plurality of geographical regions, wherein each geographical region is subdivided into a plurality of local Access Transport Areas (LATAs), each LATA is subdivided into a plurality of Number Plan Areas (NPAs), each NPA controls a plurality of NXX exchanges, and each NXX exchange controls a plurality of Central Office (CO) switches.

The method is comprised of the steps of: (a) integrating a parallel-distributed computer system into the telecommunications network to define a plurality of concurrently operating independent nodes distributed throughout the telecommunications network in a hierarchical arrangement comprising tiered groups of nodes within the network, a first tier group of said nodes strategically located within the network to monitor and control local call traffic within the NPAs, a second tier group of nodes strategically located within the network to monitor and control local long distance traffic within a LATA or a geographical region having multiple LATAs, and a third tier group of nodes strategically located within the network to monitor and control long-distance and international call traffic; (b) receiving a telephone call transaction request within the telecommunications network at a first node within said first tier group, the transaction request defining a first telephone number identifying a call origination point and a second telephone number identifying a call destination point; (c) receiving a vector call trajectory at said first node from the telecommunications network, the vector call trajectory comprising a plurality of vector segments defining a switch-to-switch pathway of said call between said call origination and destination points; (d) converting the vector call trajectory into a corresponding node-to-node billing trajectory bitmap; (e) identifying, at each node of said billing trajectory bitmap, which of the plurality of call carrier billing entities within a call billing segment associated with the node are being used and the associated call carrier costs; (f) alerting each of the nodes along the billing trajectory bitmap to generate a respective billable call segment for communication to a subsequently assigned call owner immediately upon receipt of a telephone call disconnect notification; (g) establishing ownership of the telephone call, at said first node, among said first, second and third tier groups; (h) assigning ownership of the call to a call owner node within one of said first, second and third tier groups; (i) receiving notification at the first node that the telephone call has disconnected; and (j) merging the individual billing components at said assigned call owner node. Additionally, each call owner node preferably assigns a unique system identifier to the call, wherein the first several digits, equal to the number of tiers in the hierarchy or a predetermined discrete value, represent the hierarchical position of the call owner node within the system, and the remaining digits are derived from a unique sequential number of the call owner node. Alternatively, the unique system identifier can be derived by using the vector bitmap trajectory and then adding the aforementioned remainder digits derived from a unique sequential number of the call owner node. Preferably, the unique system identifier field should be more than ten digits in length.

Preferably, the first node determines whether the call transaction comprises a billable connected call, after the telephone call transaction request has been received. Furthermore, the method preferably includes the step of receiving acceptance of call ownership from the assigned call owner node after notification is received at the first node that the telephone call has disconnected. Preferably, upon receiving notification at the first node regarding call disconnection, the call owner node transmits a message to the informed nodes along the billing trajectory bitmap including a unique system identifier corresponding to the telephone call transaction.

In a further aspect of the present method, once one or more CDRs reflecting the actual costs of the billable call segments have been generated by the network, they are compared with respective billable call segments previously communicated to the assigned owner in order to confirm their accuracy. If they are accurate, a confirmation message is preferably communicated to the assigned owner node, including the unique system identifier. Alternatively, where a cost differential is determined upon making the comparison, the particular billable call segment is recalculated and communicated to the call owner node.

BRIEF DESCRIPTION OF THE DRAWINGS

Various other objects, advantages, and features of the invention will become apparent to those skilled in the art from the following discussion taken in conjunction with the following drawings, in which:

FIG. 1 is diagram of two and four node networks;

FIG. 2 is graph showing how complexity increases with network size;

FIG. 3 is shows how management reduces complexity;

FIG. 4 shows a management synergy example between headquarters 1, 2, and 3 (HQ1, HQ 2, and HQ3);

FIG. 5 shows the linkage between Intelligent Billing System (IBS) and Total Quality Management (TQM);

FIG. 6 is a graph showing the complexity of multiple node networks;

FIG. 7 is a graph showing the complexity of single node networks;

FIG. 8 through 14 show how calls occur within a present telephone network:

FIG. 8 is a diagram of an Intra Central Office Call (HQ 0 parent);

FIG. 9 is a diagram of an Intra Exchange Office Call (HQ 0 parent);

FIG. 10 is a diagram of an Intra Numbering Plan Area (NPA), commonly know as area code, call (HQ 2 parent);

FIG. 11 is a diagram of an Intra Local Access and Transfer Area (LATA) Call (HQ3 parent);

FIG. 12 is a diagram of an Intra Regional Call (HQ 4 parent);

FIG. 13 is a diagram of an Inter Regional Call (HQ 5 parent);

FIG. 14 is a diagram of an International Long Distance Call (HQ 5 parent);

FIGS. 15 through 23 show and describe how billing entity is generated using CDR as the source of data, according to the Doctoral Dissertation of the present inventor:

FIG. 15 is an example of an Intelligent Component (IC);

FIG. 16 is an example of an intelligent Data Warehouse/Intelligent Network Information Warehouse (IDW/INIW);

FIG. 17 is a schematic representation of an IBS method of generating an IBS_Valid_CDR from a CO (Intra CO call HQ 0);

FIG. 18 is schematic representation of an IBS method of generating an IBS_Valid_CDR from a CO (Intra NXX call HQ 1);

FIG. 19 is a schematic representation of an IBS method of generating an IBS_Valid_CDR from a CO (Intra NPA call HQ2 );

FIG. 20 is a schematic representation of an IBS method of generating an IBS_Valid CDR from a CO (Intra LATA call HQ3 );

FIG. 21 is a schematic representation of an IBS method of generating an IBS_Valid_CDR from a CO (Intra Regional call HQ4 );

FIG. 22 is a schematic representation of an IBS method of generating an IBS_Valid_CDR from a CO (Intra Regional call HQ5);

FIG. 23 is a schematic representation of an IBS method of generating an IBS_Valid_CDR from a CO (International call HQ 5 );

FIGS. 24 through 30 show how to build a billing entity from network packets;

FIG. 24 is a schematic representation of an IBS method of generations an IBS_Vector_CDR from SS7 protocol packets (ISUP and/or ATM) Intra-Co call (HQ 0 Parent);

FIG. 25 is schematic representation of an IBS method of generating an IBS_Vector_CDR from SS7 protocol packets (ISUP and/or ATM) Intra-NXX call (HQ1 Parent);

FIG. 26 is a schematic representation of an IBS method of generating an IBS_Vector_CDR from SS7 protocol packets (ISUP and/or ATM) Intra-NPA call (HQ2 Parent);

FIG. 27 is a schematic representation of an IBS method of generating an IBS_Vector_CDR from SS7 protocol packets (ISUP and/or ATM) Intra-LATA call (HQ3 parent);

FIG. 28 is a schematic representation of an IBS method of generating an IBS_Vector_CDR from SS7 protocol packets (ISUP and/or ATM) Intra-Regional call (HQ4 Parent);

FIG. 29 is a schematic representation of an IBS method of generating an IBS_Vector_CDR from SS7 protocol packets (ISUP and/or ATM) Inter-Regional call (HQ % Parent);

FIG. 30 is a schematic representation of an IBS method of generating an IBS_Vector_CDR from SS7 protocol packets (ISUP and/or ATM) Inter-National call (HQ5 Parent);

FIG. 31 is a schematic sample Bell South telecommunications (BST) organizational hierarchy structure;

FIG. 32 is a schematic sample North Florida Network;

FIG. 33 is a schematic sample Central Florida Network;

FIG. 34 is a schematic sample South Florida Network;

FIG. 35 is a schematic sample Alabama-Georgia Network;

FIG. 36 is a schematic sample Tennessee-Kentucky-Mississippi-Louisiana Network;

FIG. 37 is a schematic South Carolina-North Carolina Network; and

DETAILED DESCRIPTION OF THE PREFERRED EMBODIMENTS

Figure 1:
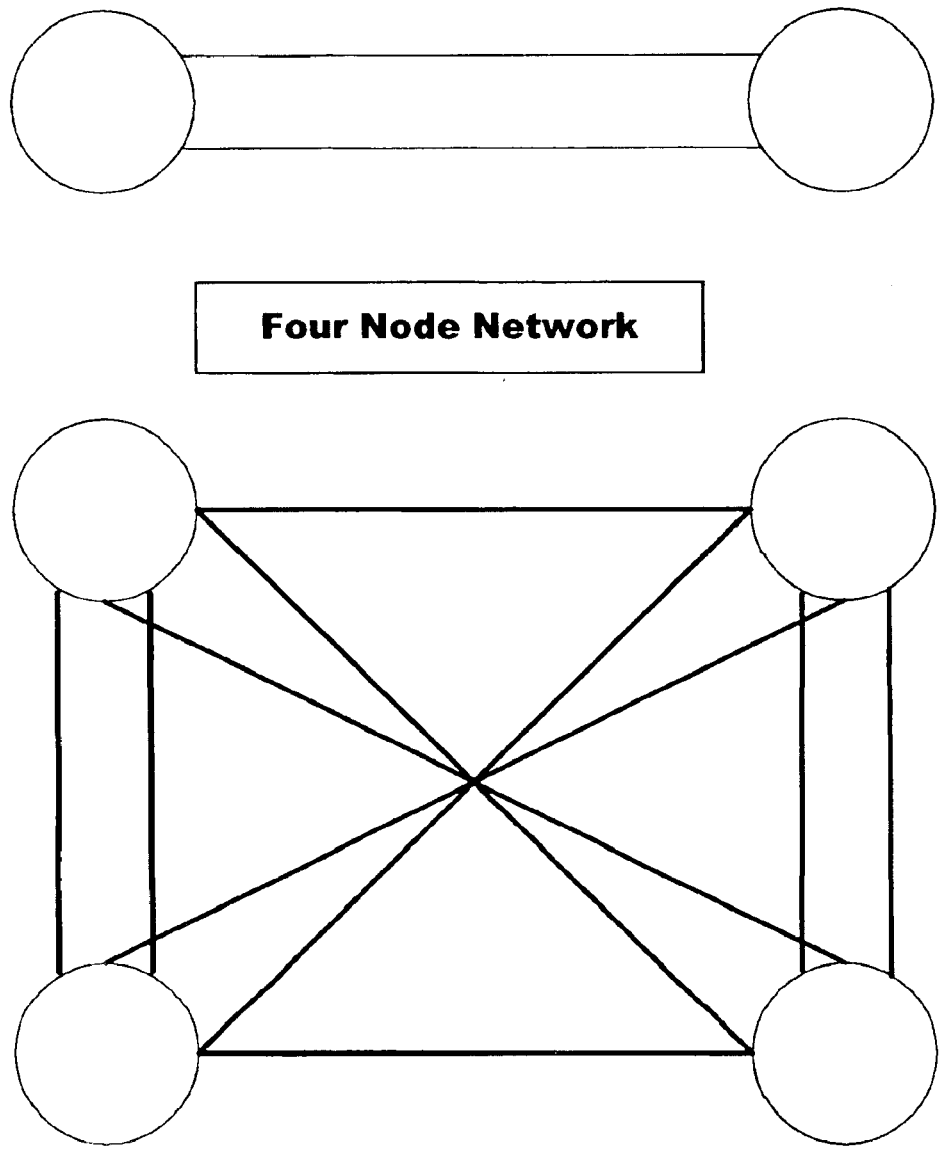
FIGS. 1 through 7 are included to show the complexity of large networks.
Figure 2:
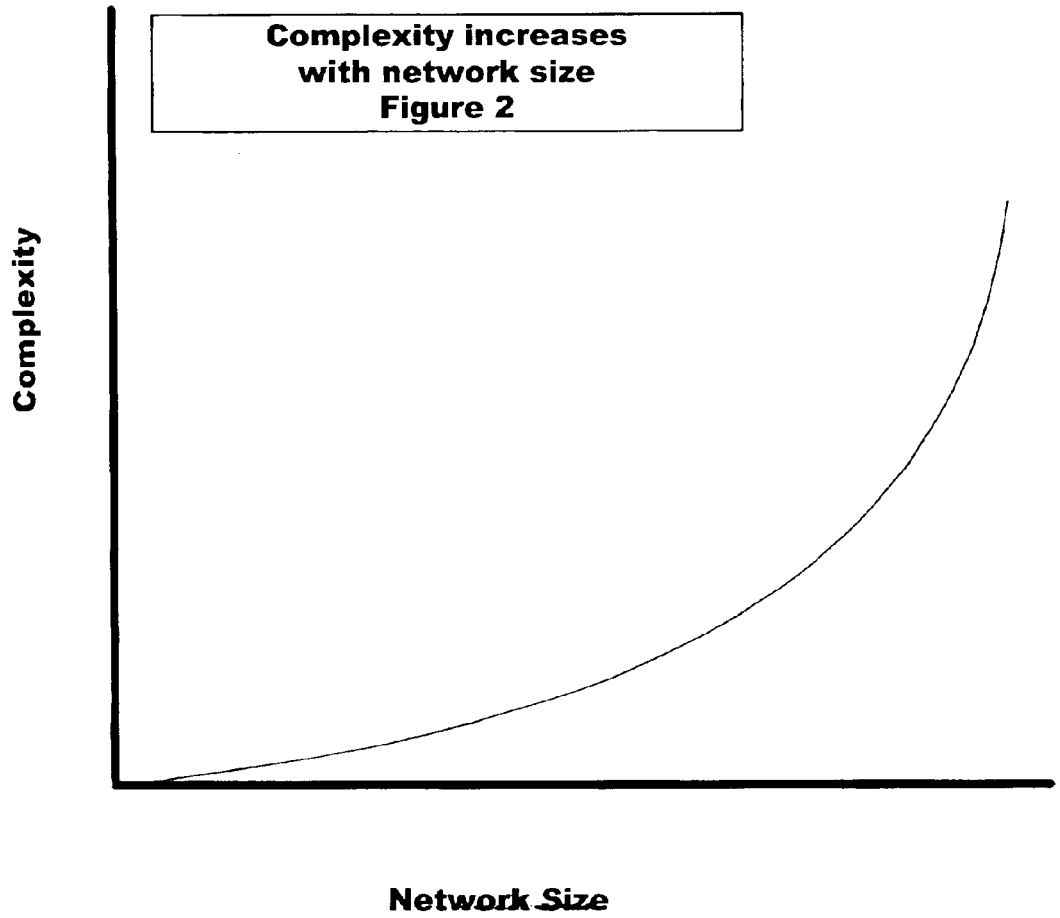
Figure 3:
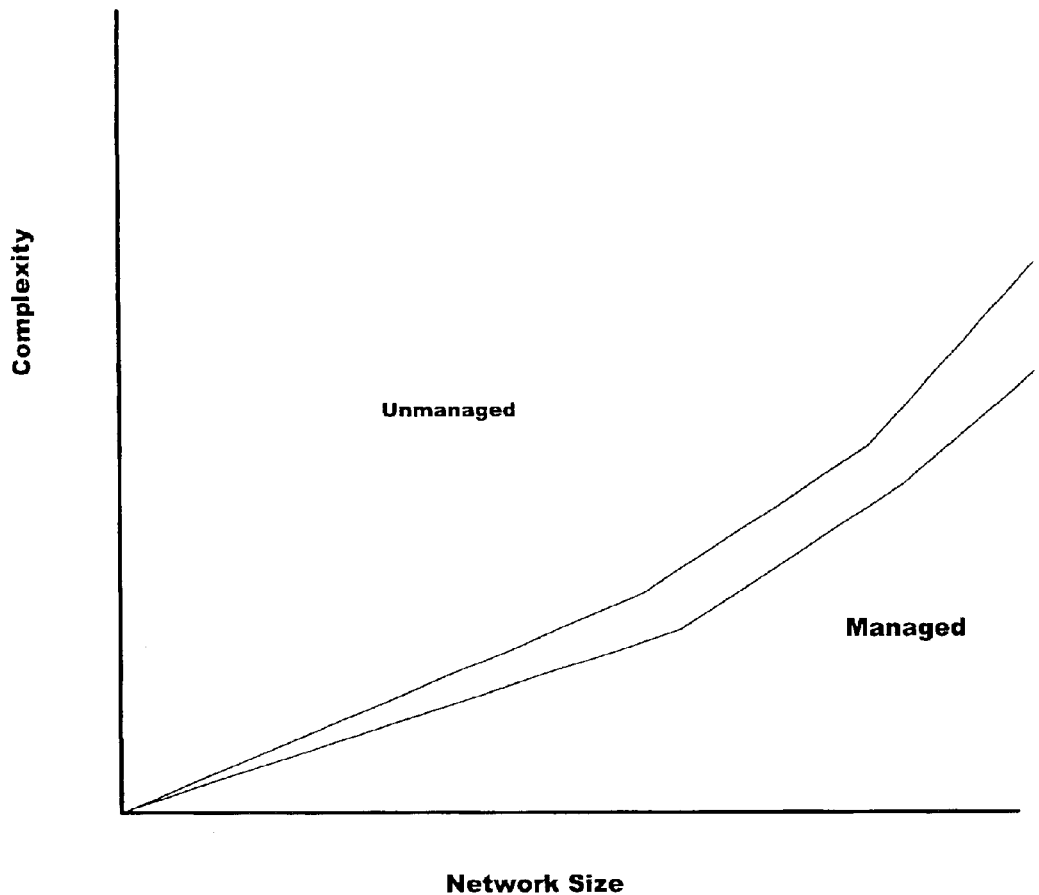
Figure 4:
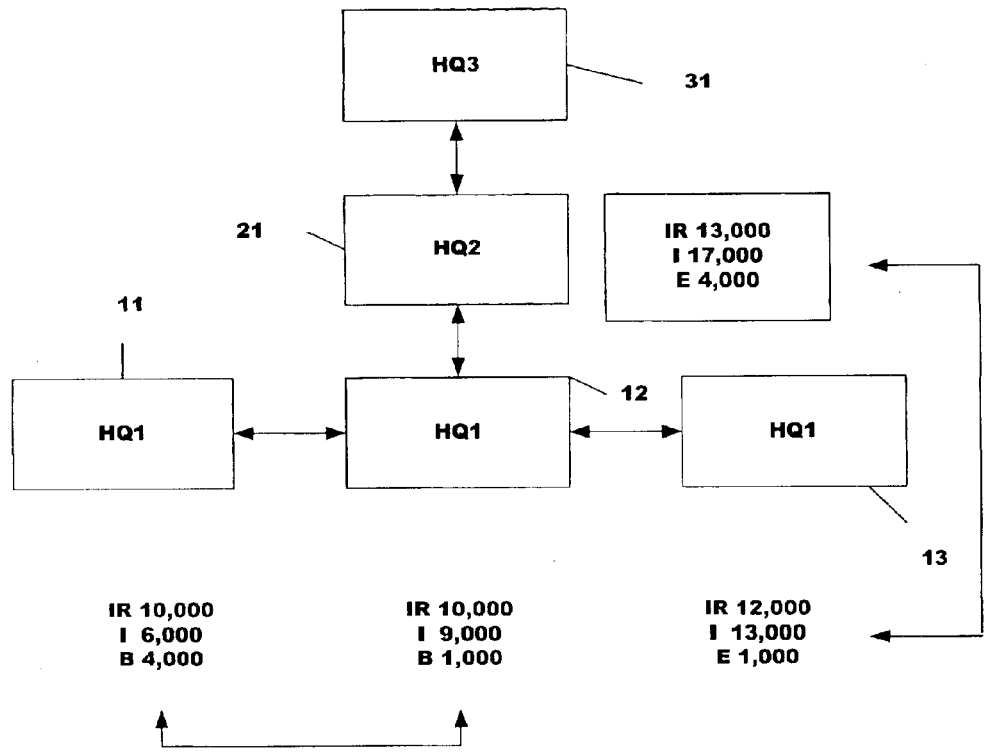
Figure 5:
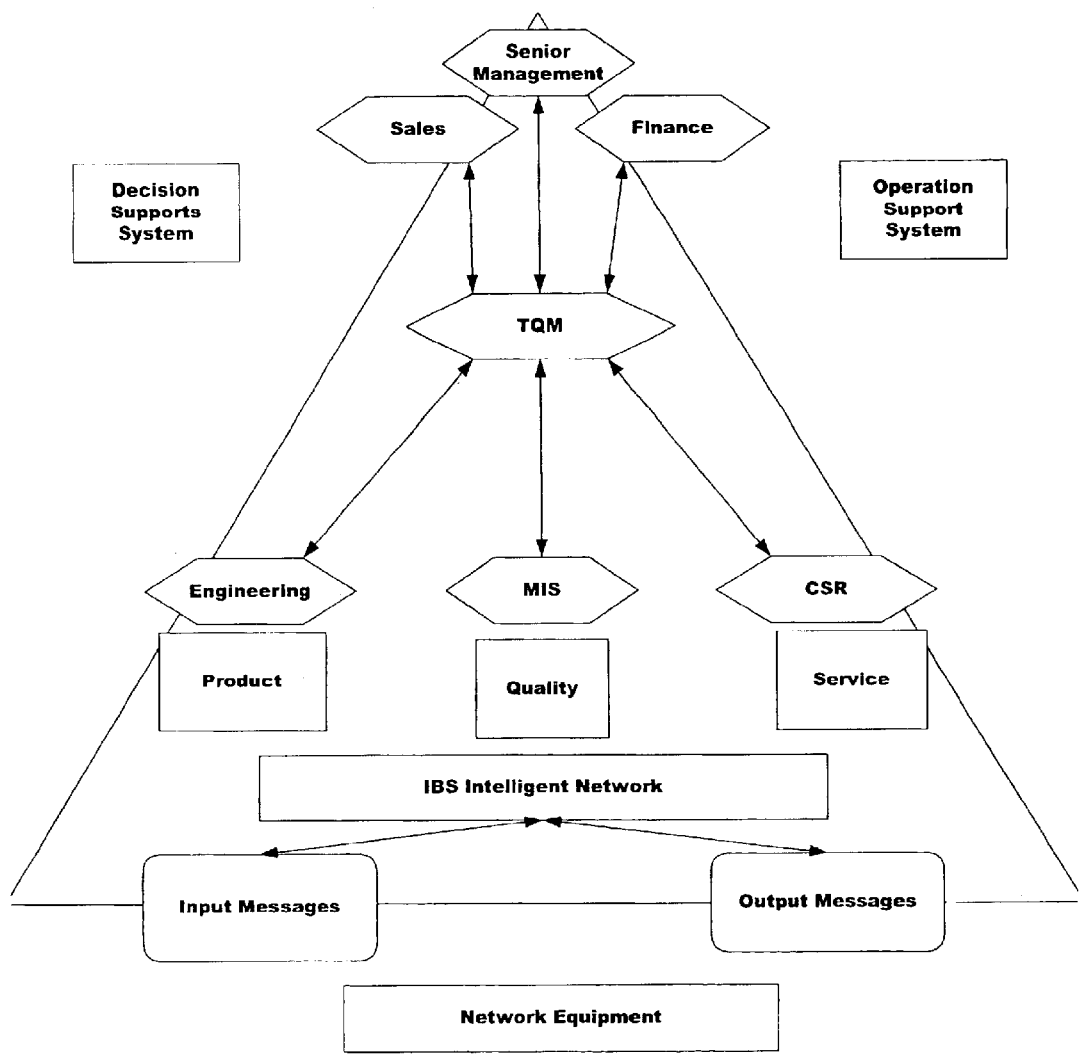
Figure 6:
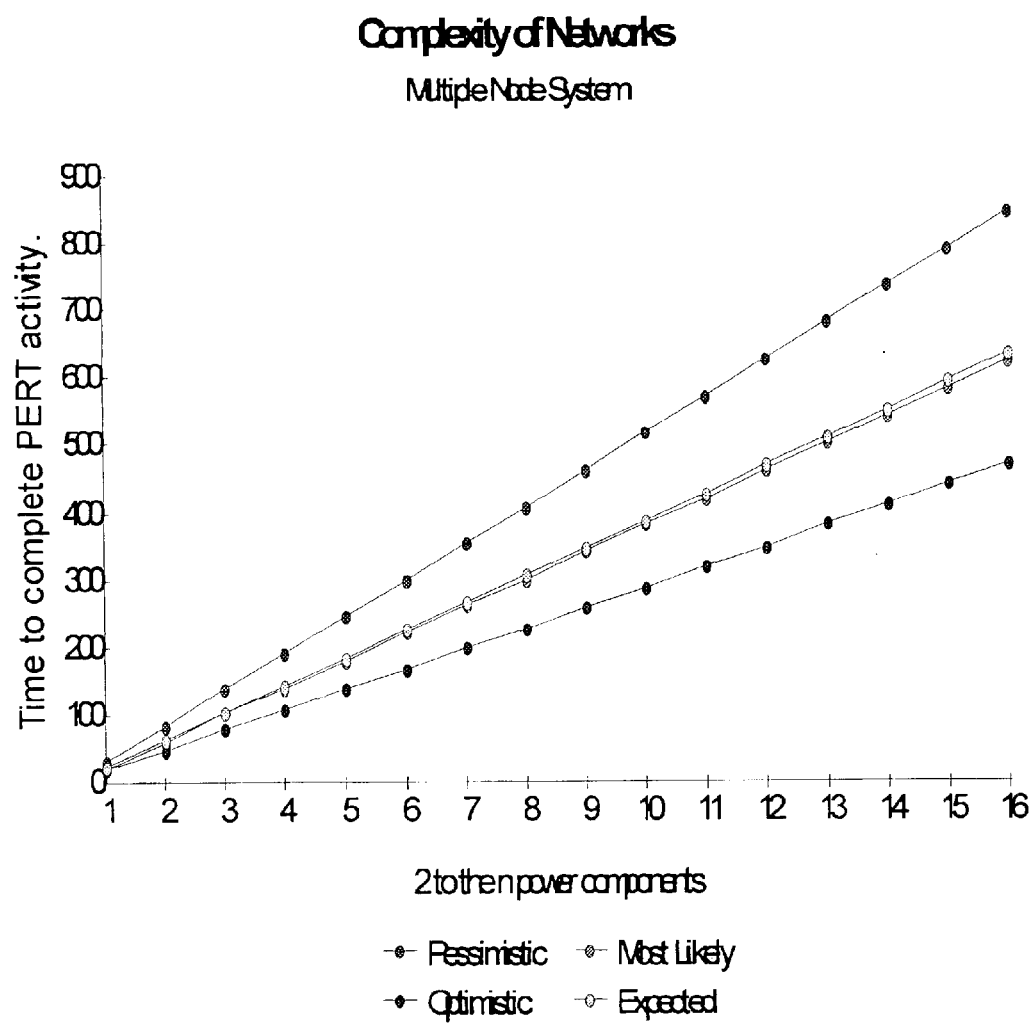
Figure 7:
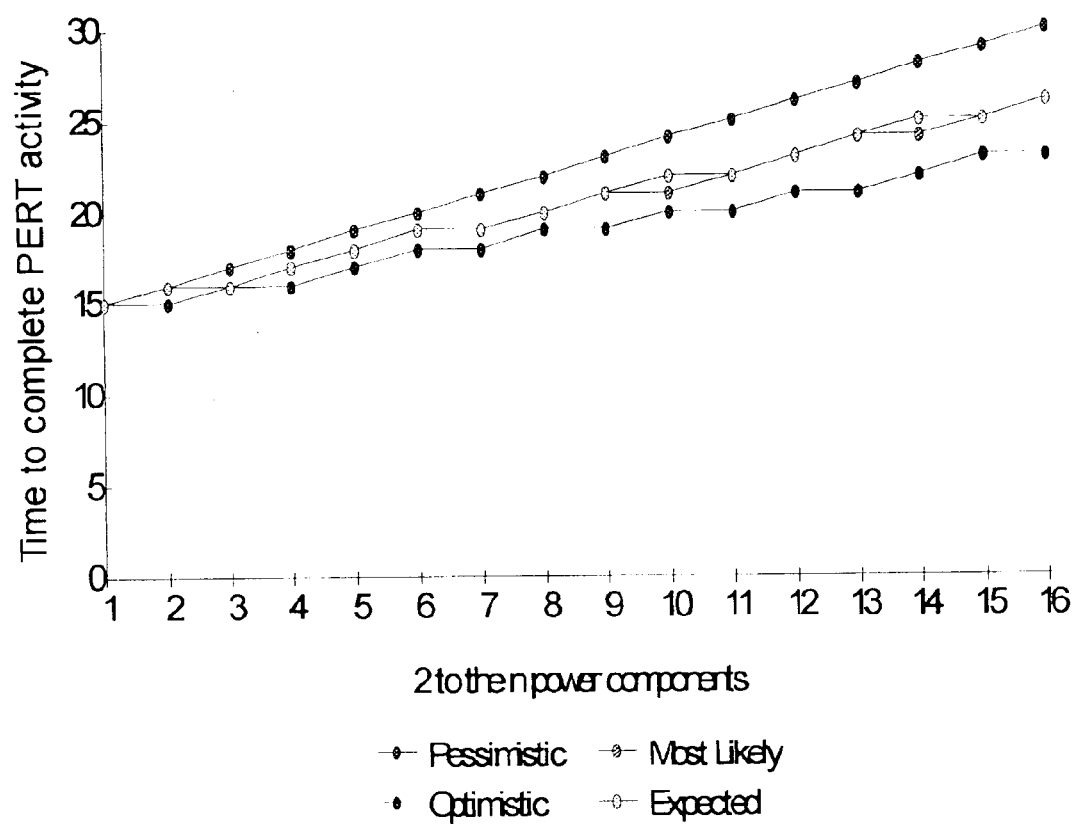
Figure 8:
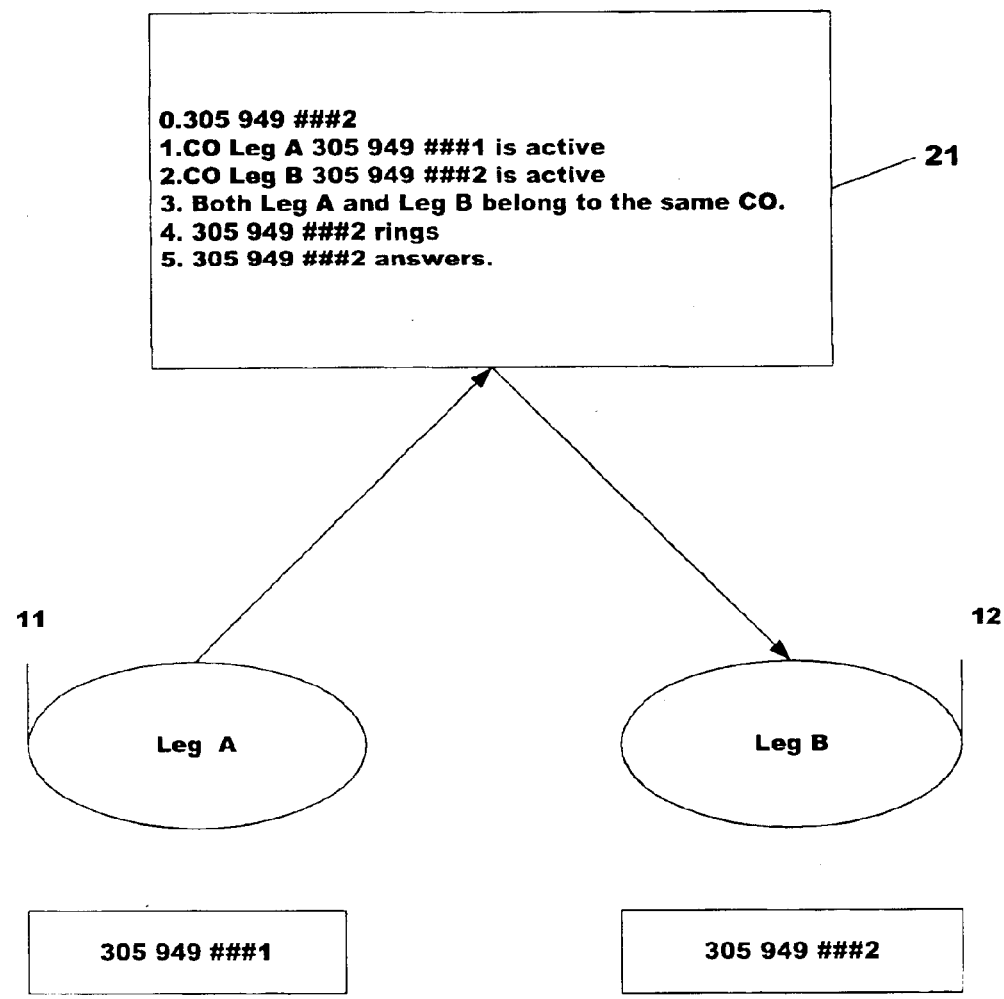
Figure 9:
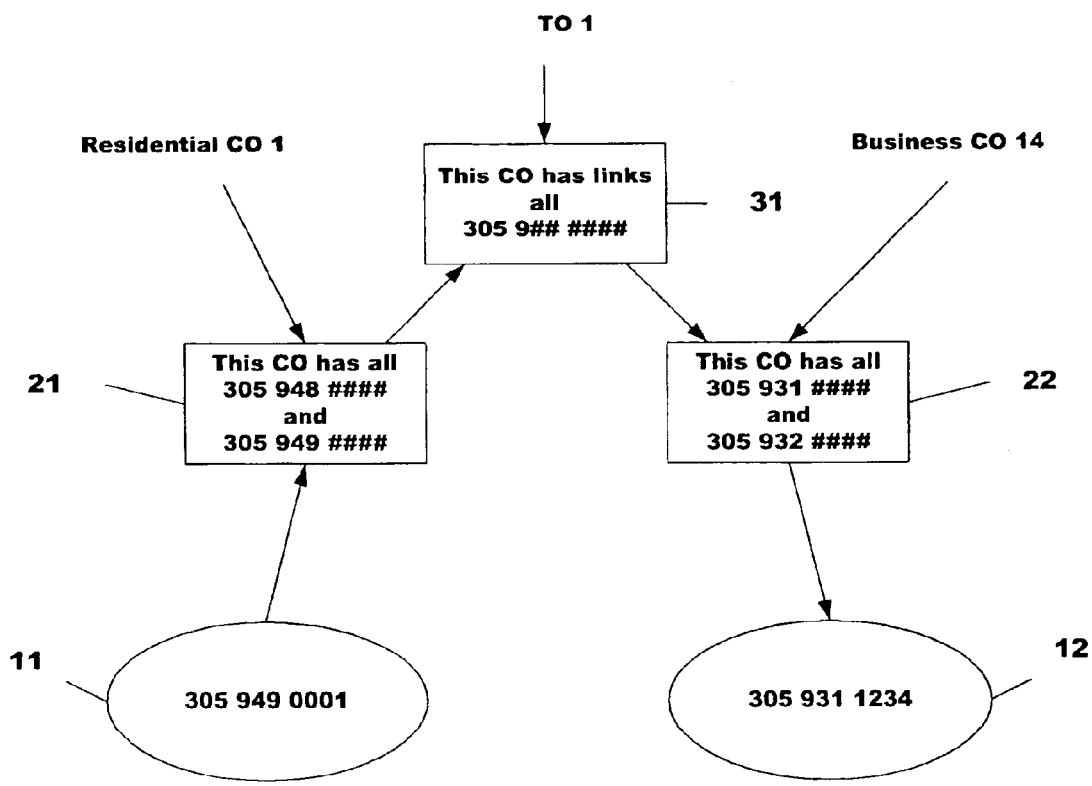
Figure 10:
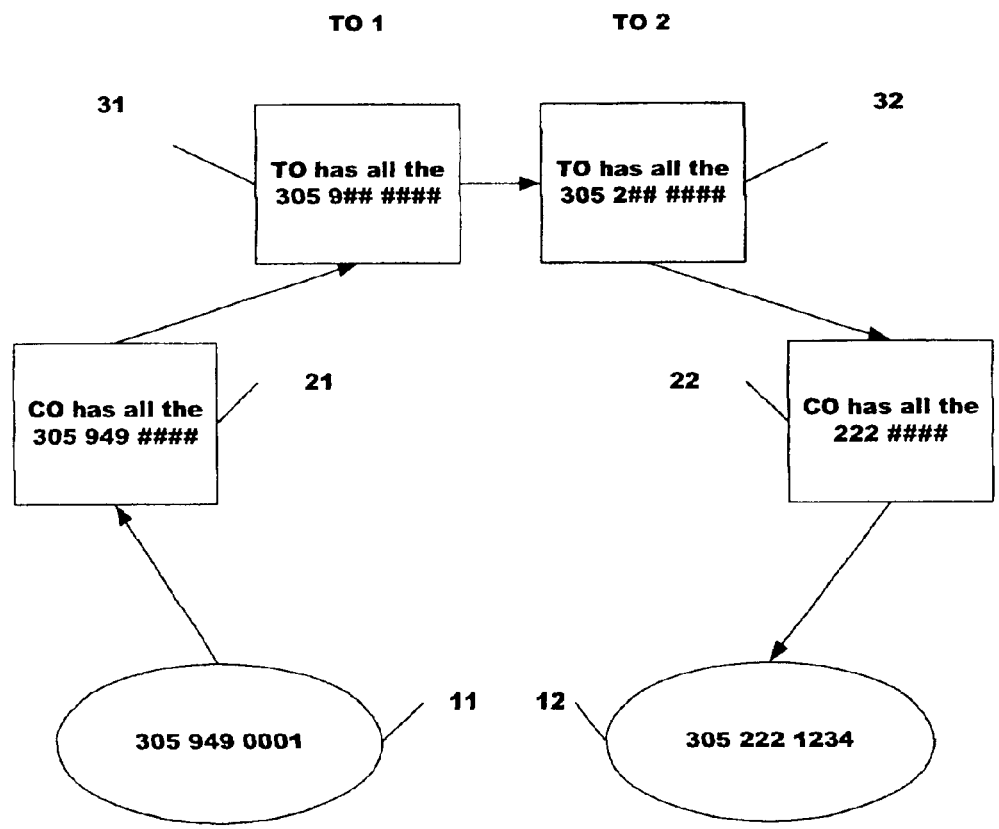
Figure 11:
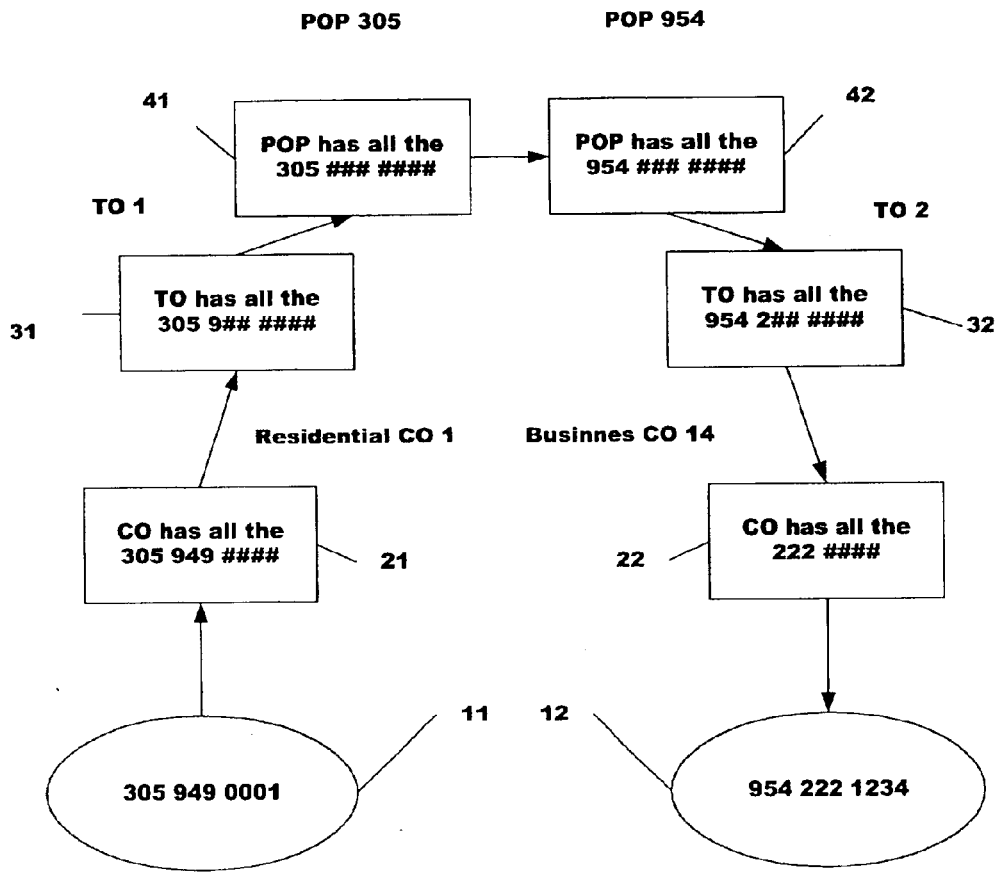
Figure 12:
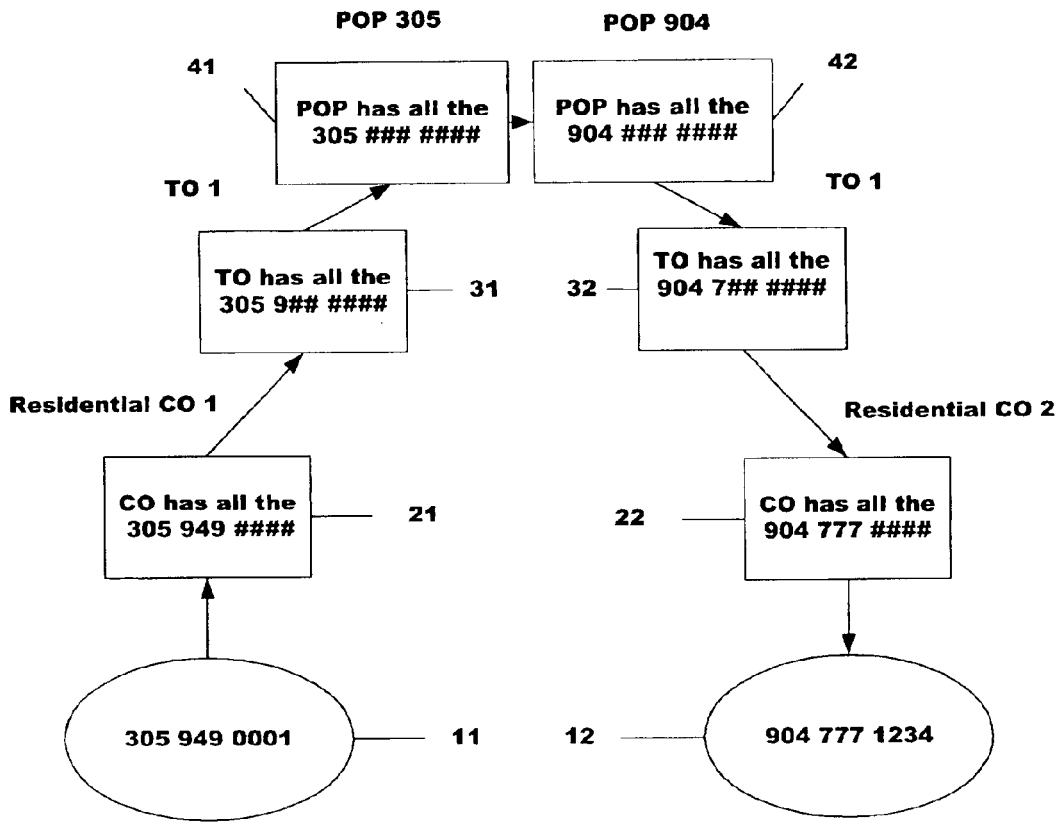
Figure 13:
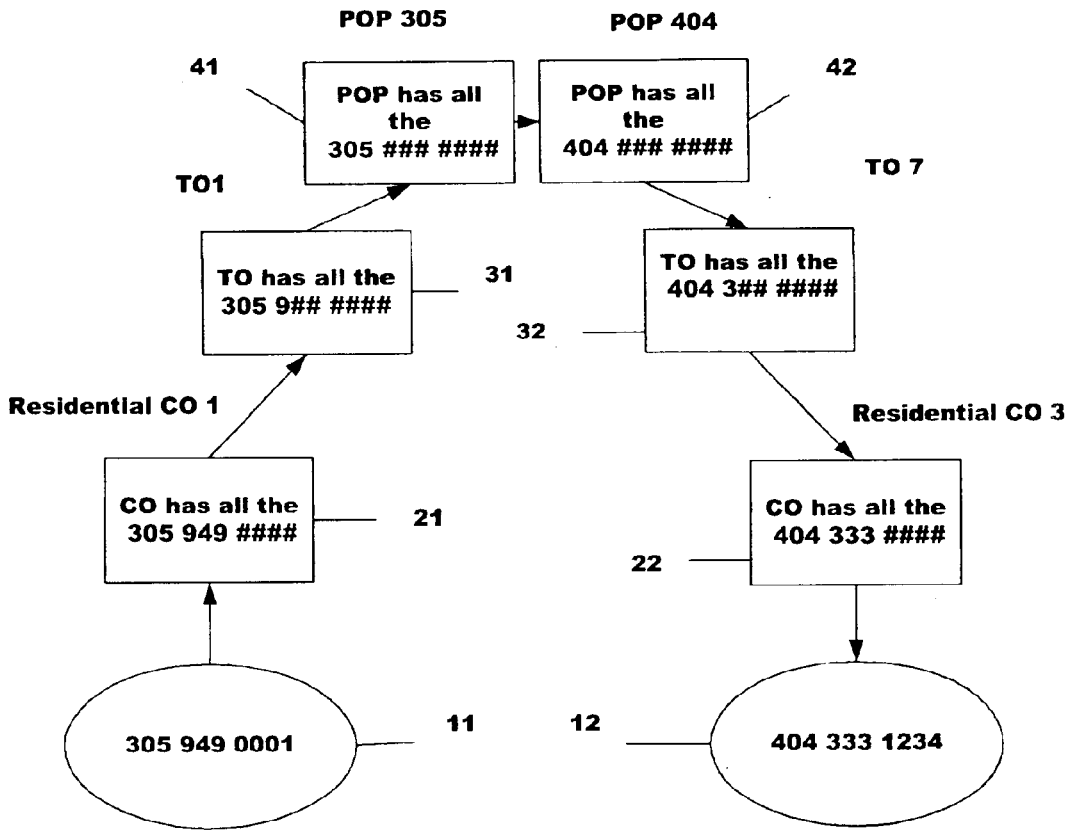
Figure 19:
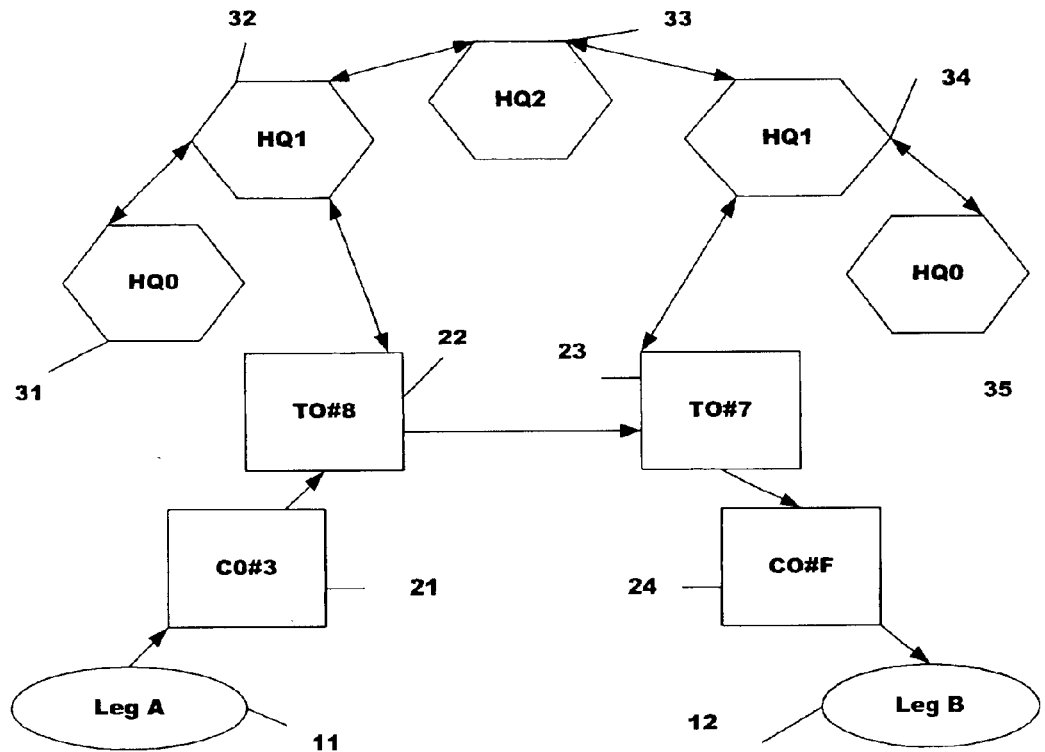
Figure 20:
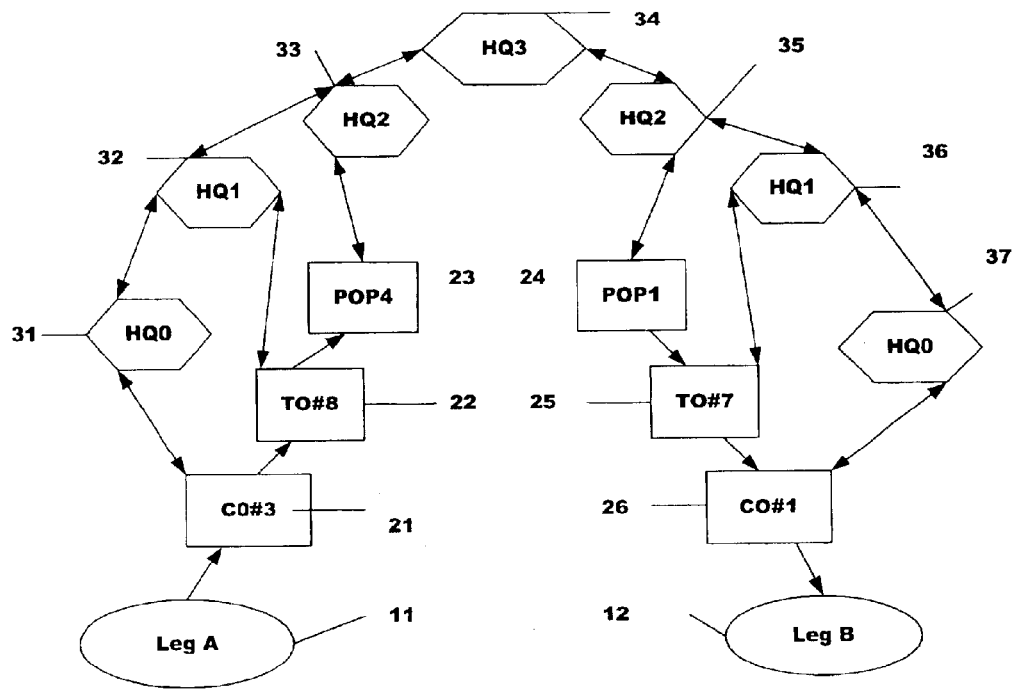
Figure 21:
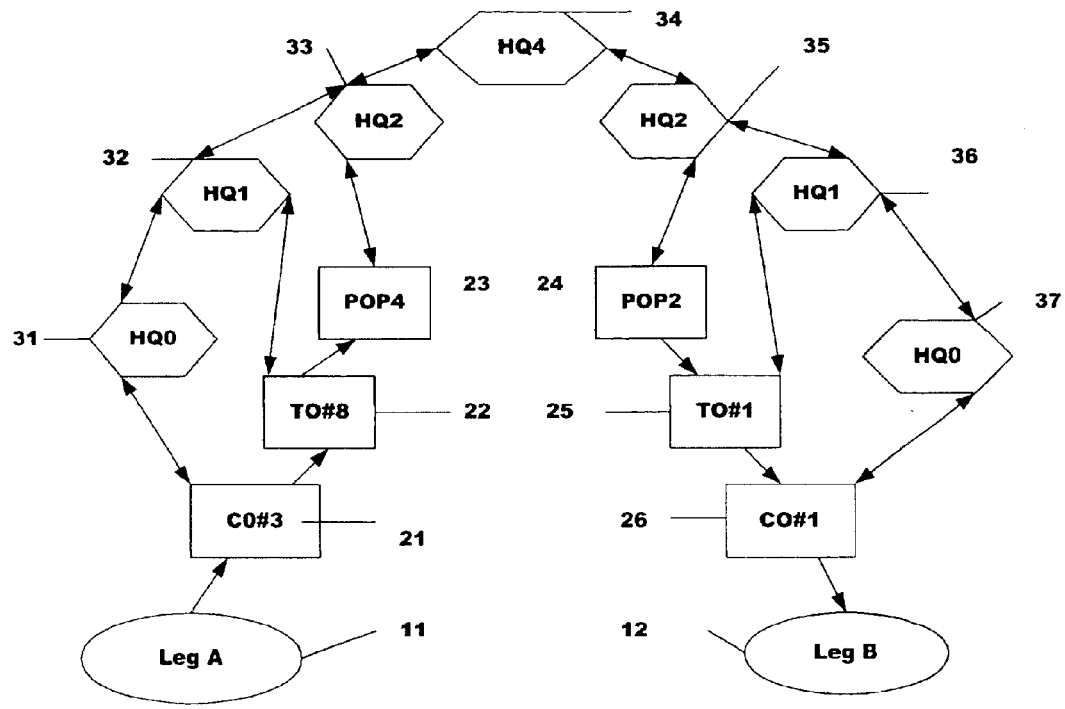
Figure 22:
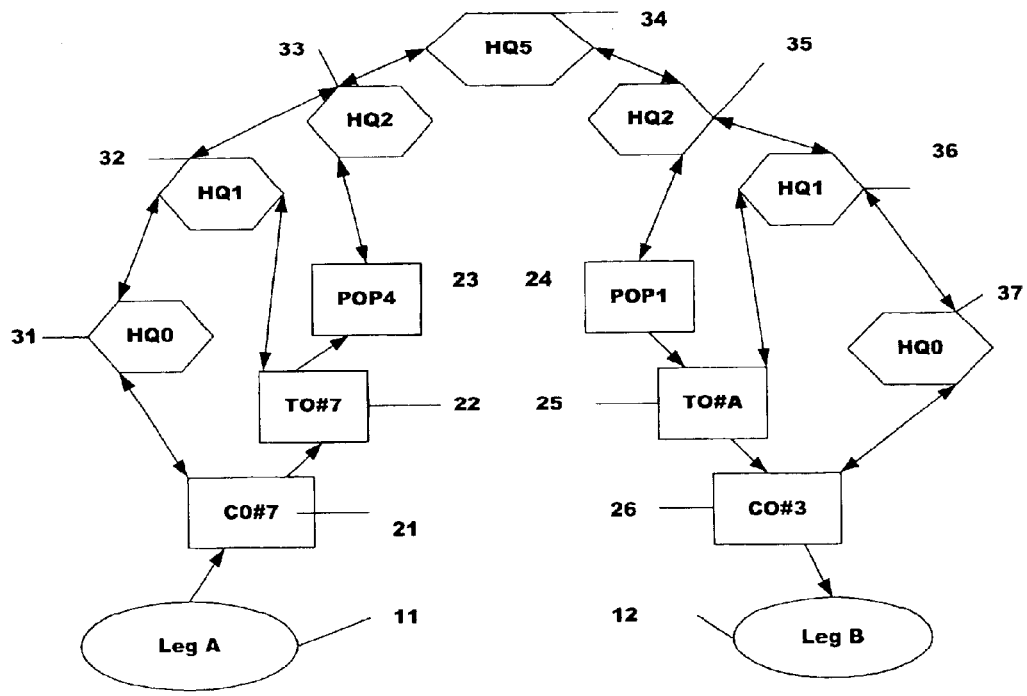
Figure 23:
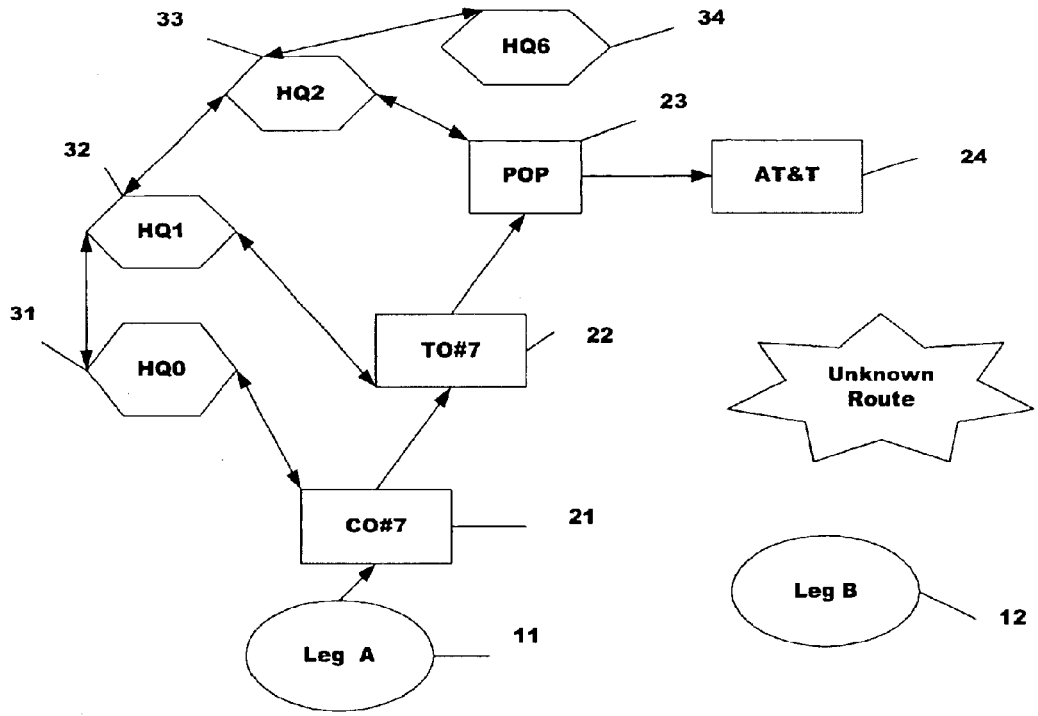
Figure 24:
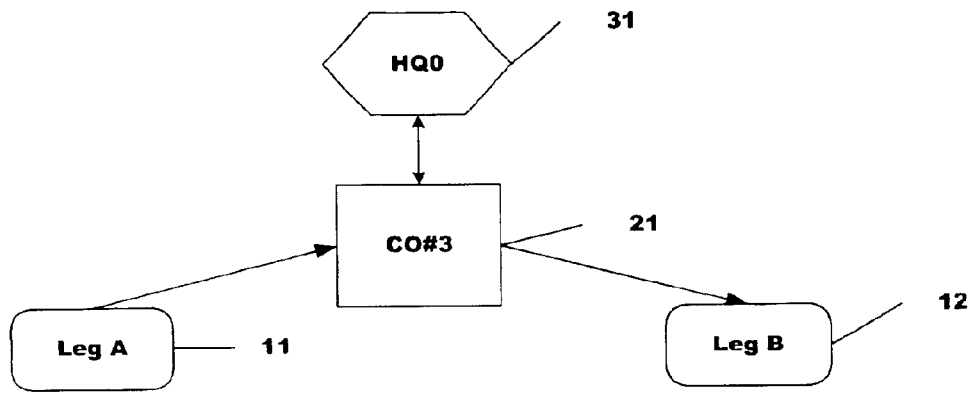
Figure 31:
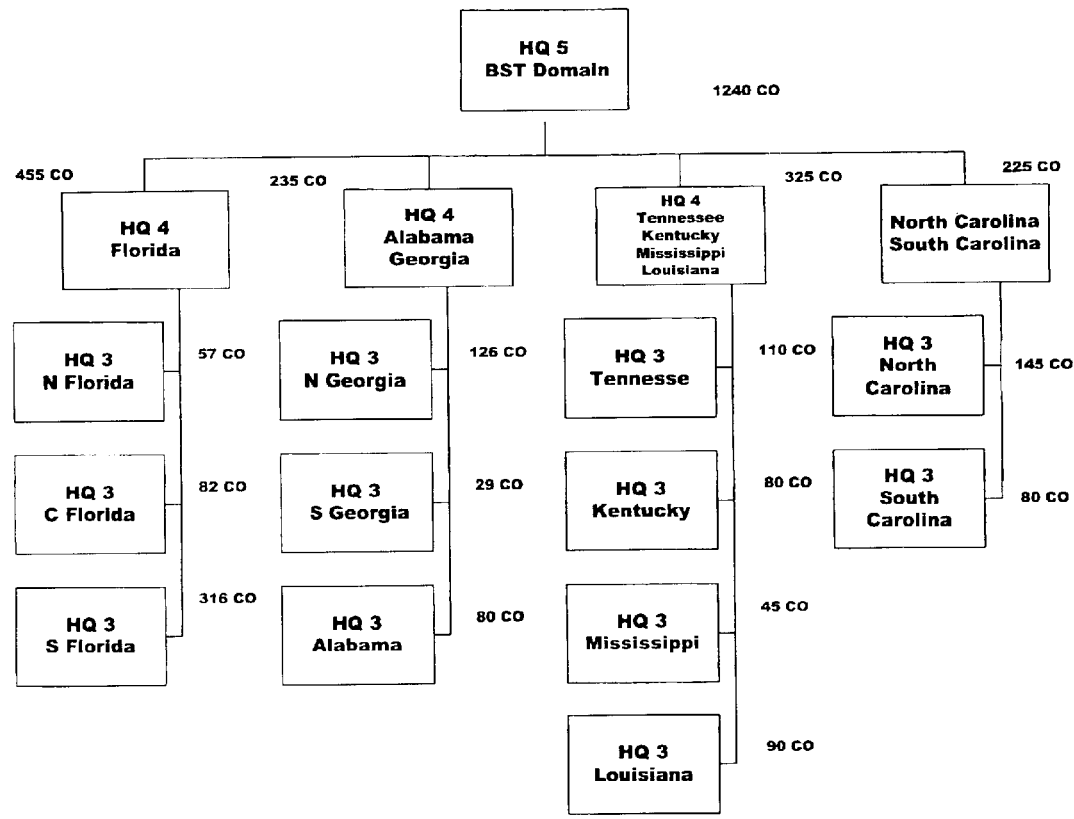
FIG. 31 through 37 show and explain in detail the geography and the actual Beowulf-like configuration for the system.
Figure 32:
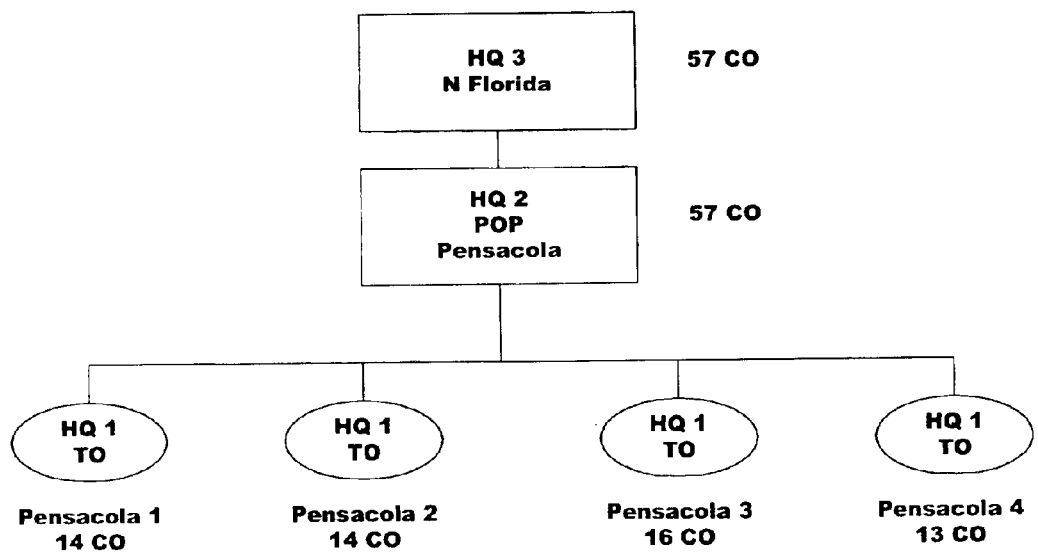
Figure 33:
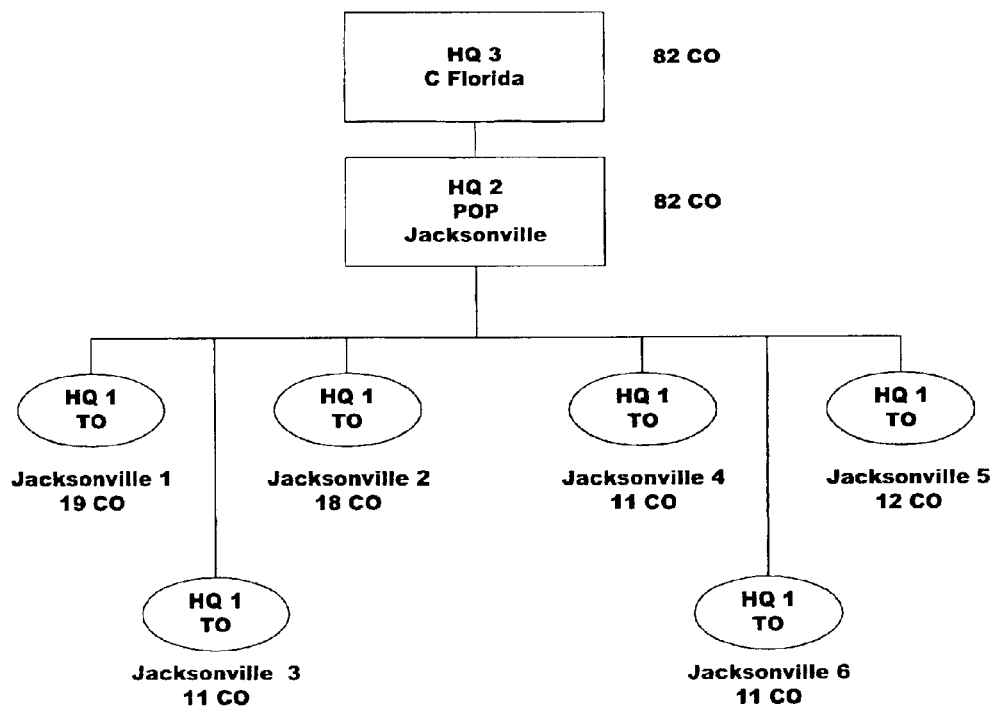
Figure 34:
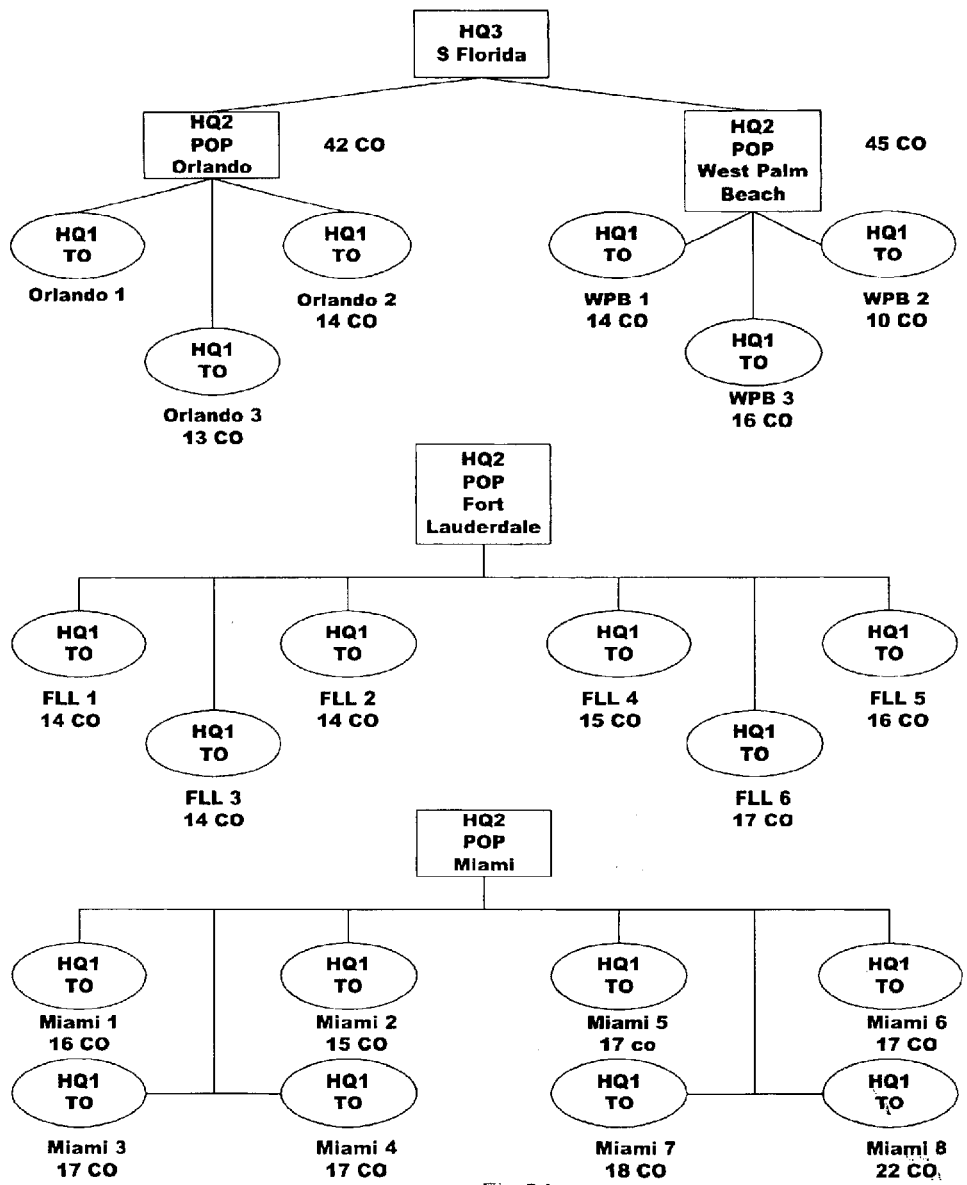
Figure 35:
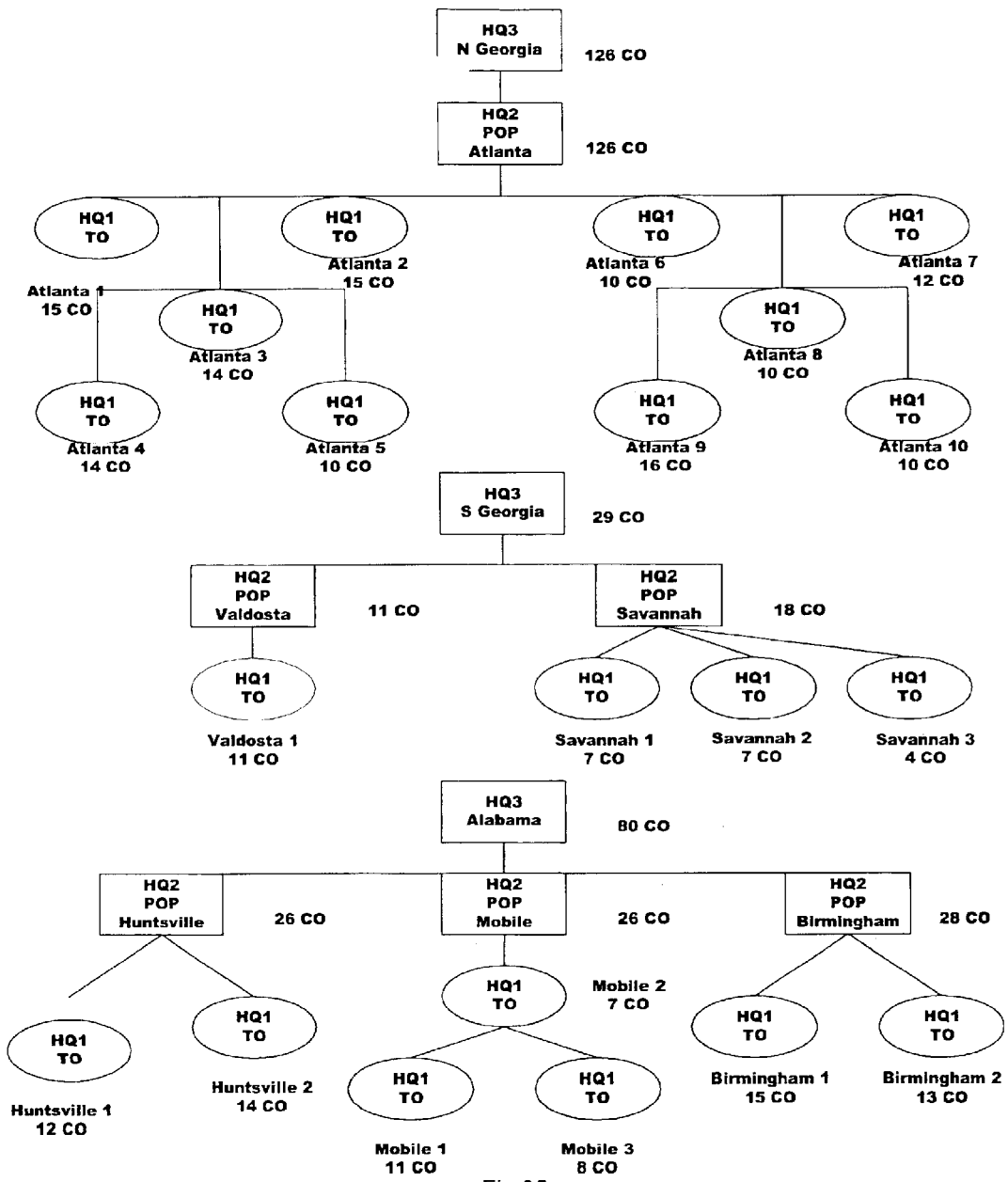
Figure 36:
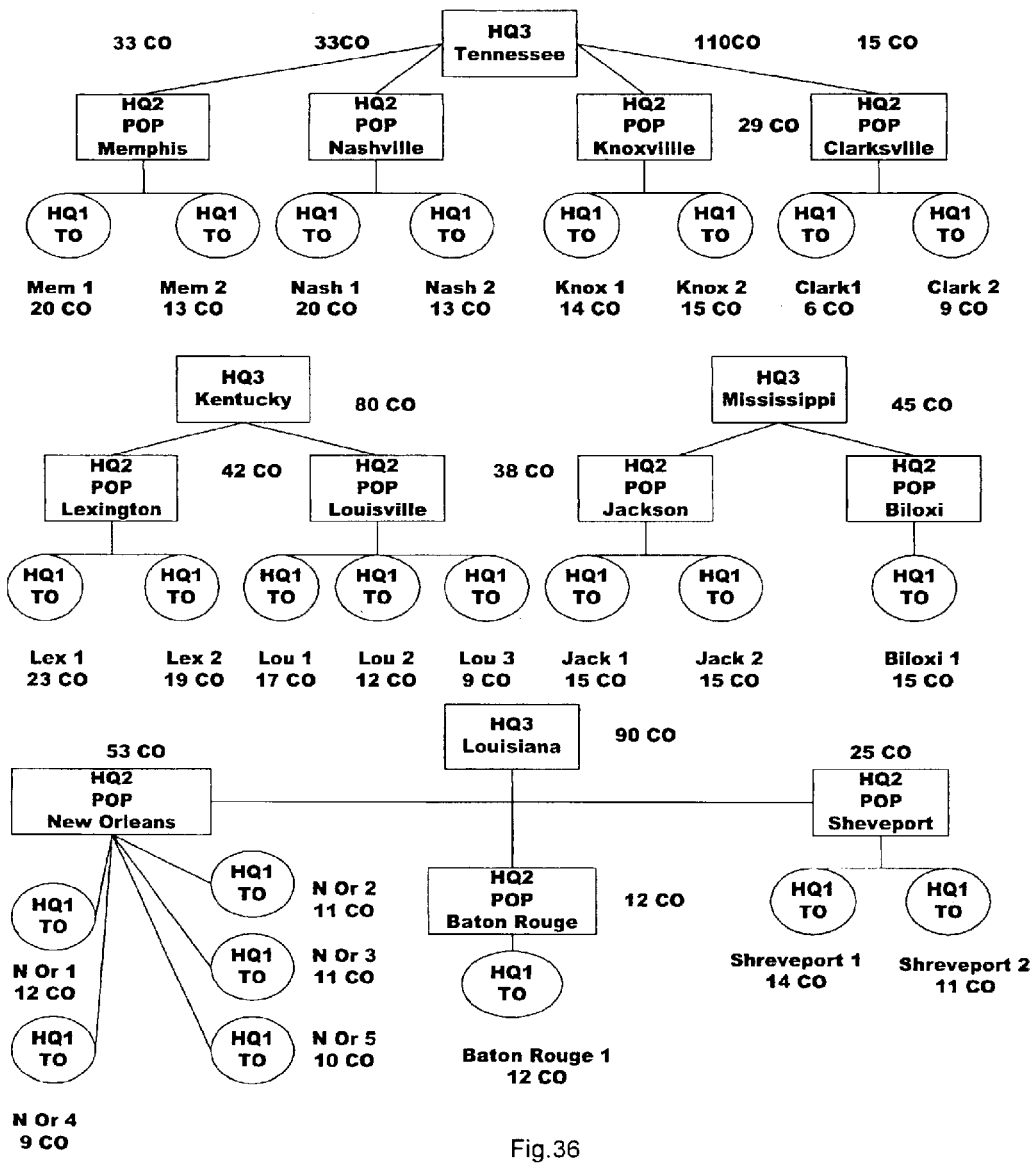
Figure 37:
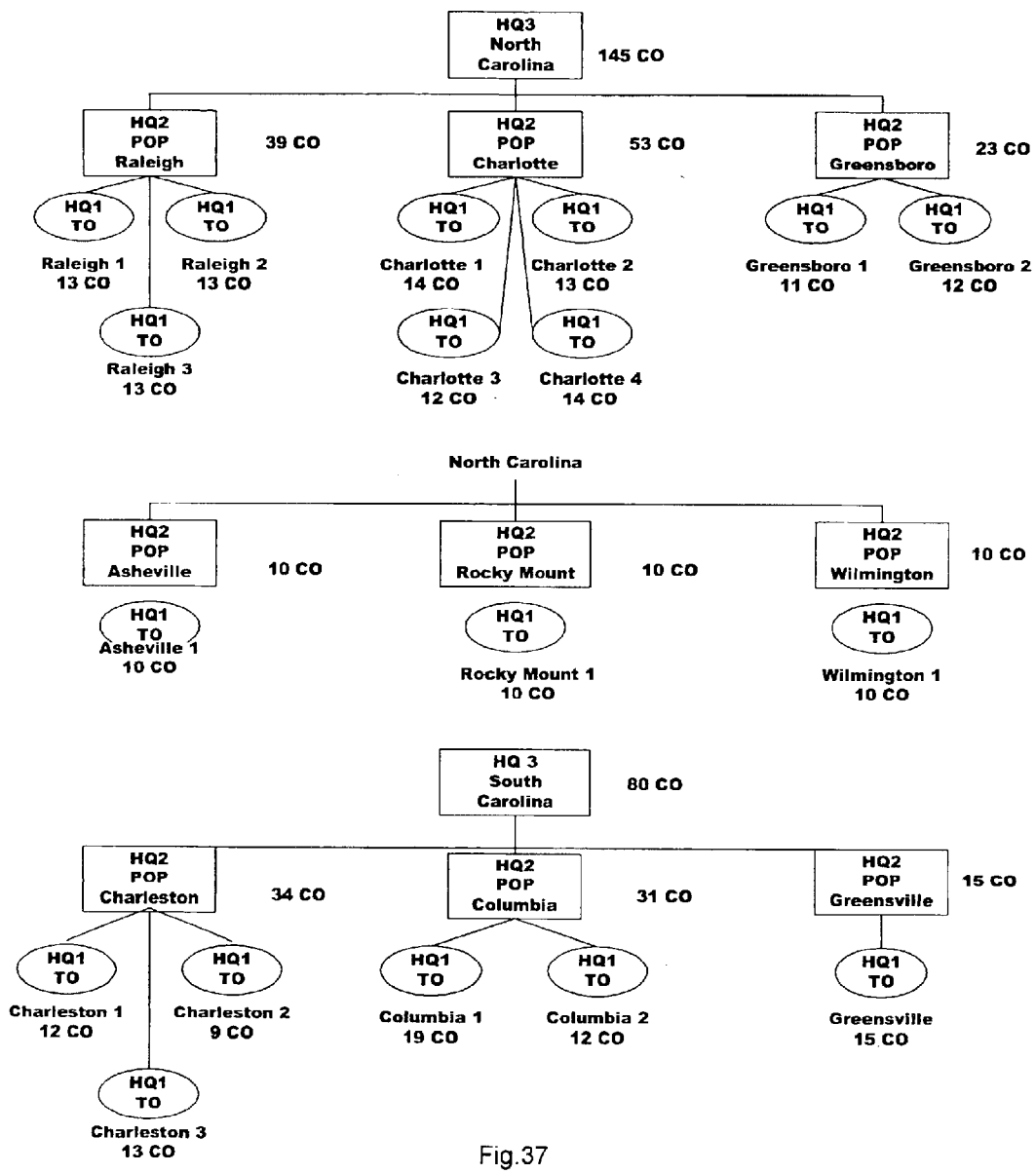

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawing, wherein like characteristics and features of the present invention shown in the various figures are designated by the same reference numerals.

The Basic System Element

Figure 38:
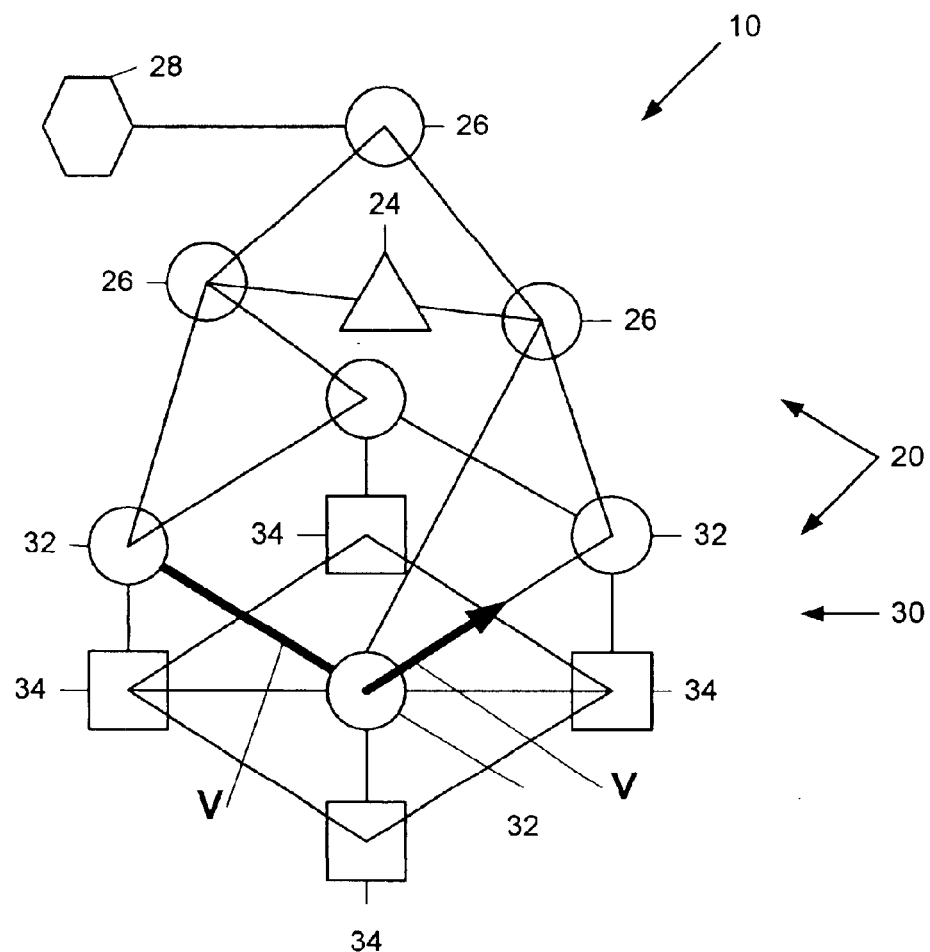
FIG. 38 is a schematic representation of the parallel telecommunications and simulation networks.

The essential element from which the system 10 is constructed is a pair of network links, represented in FIG. 15 as Leg A and Leg B, meeting at a junction point in the form of a telecommunications junction point computer 34 functioning as a call routing switch (See FIG. 38). A junction point simulation computer 32 having a unique programmed identification number is connected to the telecommunications network junction point computer 34 to monitor the junction point computer 34 level of activity and simulate its operation. Vast numbers of these elements make up the parallel telecommunications and simulation networks. To optimize and verify system integrity, the system places a call which is first instantiated by the junction simulation computers, tagging junction points using identification numbers to construct a call routing vector, and then connected through the telecommunications network.

The System

Referring generally to FIGS. 1–38, and specifically to FIG. 38, the present system 10 replaces existing centralized large routing and billing computers with the simulation network 20, which comprises a hive of relatively inexpensive, smaller computers, interlinked as a hierarchy and including parent and junction point simulation computers 26 and 32, respectively, dedicated computers 22 for performing specific tasks and other computers 24 to provide processing power and still others at the peak of the command hierarchy to synchronize and delegate tasks among the various interlinked simulation computers with continuous automatic reevaluation and redirection in real time. A parent computer 26 may be one computer or multiple computers working together in parallel using Beowulf-like technology, and this system 10 takes advantage of this technology to construct a supercomputer-like architecture at a very low cost. In this way, these smaller simulation computers are spread throughout the telecommunications network 30, and simulate the operations of the telecommunications network 30. The telecommunications network is divided broadly at certain junction points into local Access and Transport Areas hereinafter referred to as LATA'S, each of which may be one or more telephone area codes. Within each LATA and thus within the region of one or more area codes, one point of presence, hereinafter referred to as POP switches, there is a table of local Tandem Office Switches, hereinafter referred to as Tandems, which for example might be telephone exchanges defined by the first three numbers of a local telephone number. A call routing vector v is progressively constructed for each individual call by forward chaining through the simulation computers, through a series of the junction points separating LATA, point of presence (POP) switches within each LATA, Tandems within each POP switch, and ultimately the specific telephone numbers within each central office switch, hereinafter referred to as CO, which has the local loops or telephone lines.

The simulation computers monitor activity and buffer levels of telecommunications computers 34 and use the information to make call routing decisions which shunt calls from telecommunications network computers 34 having larger buffers and to call providers offering the lowest rates. The simulation network 20 also saves bandwidth by making these call switching and routing decisions with the simulation computer 32 at each junction point and sending only information about the result of each decision to a parent computer 26 within the simulation hierarchy, rather than all of the information involved making each decision and by sending confirming vector routing information back to a parent computer 26 in the hive in small, summarized information packets which occupy minimal bandwidth. Furthermore, it is the task of the system 10 to define, which is the valid CDR that has all of the necessary information to create the true billing entity, thus rendering the remaining CDR obsolete. System 10 integrity is monitored for rapid detention of malfunctions, so that proactive preventative maintenance is provided, thereby minimizing downtime. Hyperlinks are preferred over modems due to their larger bandwidth.

In this way, the inventive simulation network 20 hive computers combine synergistically to minimize system 10 cost, to permit parallel simulation, to increase processing power, to minimize bandwidth usage, to permit forward and rearward chaining to maximize efficiency in telecommunications network computer operation and to permit real time fuzzy billing estimations so that billing begins as each call begins and progresses in real time. See *Designing Hot Billing System for Large Volume and/or complex Networks*, present inventor's copyrighted doctoral dissertation enclosed with parent application. The processing power and range of functions of the hive is greater than the sum of the processing powers and range of functions of each individual computer making up the hive.

EXAMPLE

An example of an application of the system would be in conjunction with a telecommunications network 30 spanning Florida and Georgia. Florida is divided into three LATA'S and Georgia is divided into two LATA'S. For calls placed from Florida, the simulation network 20 first links to parent simulation computers 26 controlling calls entering Florida, which check each of the three Florida LATA'S to see if the area codes within any Florida LATA match the dialed area code. This is a first step in forward chaining. The question of whether there is a match is answered with the sending of either a 'yes' or 'no' information packet. If there is a 'no' match, the parent simulation computer 26 directs the call to a parent simulation computer 26 controlling call routing in Georgia. Forward chaining further determines which tandems owns the call and a "vector V" is rapidly constructed. Then the completed information is sent through rearward chaining to the hive as a "billing entity", and also preserved locally in the given hive member computer. The information does not have to be requested, but is automatically sent, and decisions are made regardless of the quantity of data received. This permits the inventive real time billing provided by the present system 10, so that if the simulation network 20 were placed on the internet, one could watch ones bill grow in real time as a call progresses.

The parent simulation computers 26 continuously search for the providers giving the best rate at each moment to minimize the cost of each call. The rates of various providers may vary slightly from moment to moment depending in the varying call load experienced by each given provider.

System 10, for example, re-routes calls to remote locations if local facilities are near capacity. This re-routing has a cost, but the parent simulation computer 26 weighs costs and suggests the most economical route to Italy or France, for example, so that the cost of the call is ultimately minimized. Calls are filtered to let just certain ones through, whether to MCI, A&T or to some other carrier.

The Method

In practicing the invention, the following method may be used. The method of optimizing parameters of telecommunications call placement and billing tasks executed within a virtual environment using the above-described system 10 includes the steps of: placing discrete neural elements of a simulation network 20 in the form of junction point simulation computers 32, at telecommunications network 30 junction point locations; for each call placed with the telecommunications network, plotting a call routing vector v through the simulation network 20 with forward chaining through junction point simulation computers 32, and sending routing vector v information back through the simulation network 20 with rearward chaining to direct the call along a parallel routing vector through the telecommunications network 30.

The method preferably includes the additional steps of: monitoring activity and buffer levels of telecommunications network junction point computers 34 with a junction point simulation computer 32 at each junction point and using the buffer level information to shunt calls from telecommunications network junction point computers 34 operating at or near capacity and thus having smaller buffers to computers 34 having larger buffers and to select a call provider offering the lowest rates at the moment the call is placed.

The method preferably includes the additional step of performing at every binary time interval a network diagnostic of the entire simulation network 20, and thus of the telecommunications network 30, and plotting new call routes in the case of a system failure or misuse of existing resources, such as inadequate use of network traffic routes. The result is lower downtimes because a repair crew is warned almost immediately and the system is maintained with a proactive preventative maintenance.

The method is particularly adapted for use with a conventional telecommunications network incorporating a plurality of call carrier billing entities. Particularly, the method enables the gathering and conversion of a plurality of billable segments of a telephone call into corresponding billing components, for subsequent communication to a designated call owner. Particularly, this is accomplished in a manner enabling the call owner to effect billing immediately upon termination of the telephone call, but prior to network generation of billing component CDRs. A conventional telecommunications network covers a plurality of geographical regions, wherein each geographical region is subdivided into a plurality of Local Access Transport Areas (LATAs), each LATA is subdivided into a plurality of Number Plan Areas (NPAs), each NPA controls a plurality of NXX exchanges, and each NXX exchange controls a plurality of Central Office (CO) switches.

Initially, the parallel-distributed computer system of the present invention is incorporated into the telecommunications network to define a plurality of concurrently operating independent nodes distributed throughout the telecommunications network in a hierarchical arrangement. In particular, the hierarchical arrangement is comprised of tiered groups of nodes within the network. A first tier group of nodes is strategically located within the network to monitor and control local call traffic within the NPAs. A second tier group of nodes is strategically located within the network to monitor and control local long distance traffic within a LATA or a geographical region having multiple LATAs. A third tier group of nodes is strategically located within the network to monitor and control long-distance and international call traffic.

A telephone call transaction request is initially received within the telecommunications network at a first node within the first tier group, the transaction request defining a first telephone number identifying a call origination point and a second telephone number identifying a call destination point. Next, a vector call trajectory is received at the first node from the telecommunications network, the vector call trajectory comprising a plurality of vector segments defining a switch-to-switch pathway of the call between the call origination and destination points. Next, the vector call trajectory is converted into a corresponding node-to-node billing trajectory bitmap. Subsequently, the system determines, or identifies, at each node of the billing trajectory bitmap, which of the plurality of call carrier billing entities within a call billing segment associated with the node are being used and the associated call carrier costs. Upon identifying the appropriate call carrier billing entities, each of the nodes are alerted along the billing trajectory bitmap to generate a respective billable call segment for communication to a subsequently assigned call owner immediately upon receipt of a telephone call disconnect notification. Subsequently, ownership of the call is established and assigned, at the first node, among the first, second and third tier groups. Upon receiving notification at the first node that the telephone call has disconnected, the individual billing components are merged at the respective assigned call owner nodes. After confirming that the call has disconnected, each call owner node preferably "brands" the call with a unique system number, or identifier, wherein the first several digits of the number represent the hierarchy of the call owner node within the parallel-distributed computer system, and the remaining digits comprise a unique sequential number of the call owner node. In this manner, each call can be accessed, monitored and tracked, in real time without any redundancy.

Preferably, the first node determines whether the call transaction comprises a billable connected call, after the telephone call transaction request has been received. Furthermore, the method preferably includes the step of receiving acceptance of call ownership from the assigned call owner node after notification is received at the first node that the telephone call has disconnected. Preferably, upon receiving notification at the first node regarding call disconnection, the call owner node transmits a message to the informed nodes along the billing trajectory bitmap including a unique system identifier corresponding to the telephone call transaction.

In a further aspect of the present method, once one or more CDRs reflecting the actual costs of the billable call segments have been generated by the network, they are compared with respective billable call segments previously communicated to the assigned owner in order to confirm accuracy. If they are accurate, a confirmation message is preferably communicated to the assigned owner node, including the unique system identifier. Alternatively, where a cost differential is determined upon making the comparison, the particular billable call segment is recalculated and communicated to the call owner node.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims appended.

What is claimed is:

1. In a telecommunications network incorporating a plurality of call carrier billing entities, a method of gathering and converting multiple independent billable segments of a telephone call into corresponding billing components for communication to a designated call owner in a manner enabling the call owner to effect billing immediately upon termination of the telephone call and prior to network generation of billing component Call Detail Records (CDRs), comprising the steps of:

providing a telecommunications network covering a plurality of geographical regions, wherein each geographical region is subdivided into a plurality of Local Access Transport Areas (LATAs), each LATA is subdivided into a plurality of Number Plan Areas (NPAs), each NPA controls a plurality of NXX exchanges, and each NXX exchange controls a plurality of Central Office (CO) switches;

integrating a parallel-distributed computer system into the telecommunications network to define a plurality of concurrently operating independent nodes distributed throughout the telecommunications network in a hierarchical arrangement comprising tiered groups of nodes within the network, a first tier group of said nodes strategically located within the network to monitor and control local call traffic within the NPAs, a second tier group of nodes strategically located within the network to monitor and control local long distance traffic within a LATA or a geographical region having multiple LATAs, and a third tier group of nodes strategically located within the network to monitor and control long-distance and international call traffic;

receiving a telephone call transaction request within the telecommunications network at a first node within said first tier group, the transaction request defining a first telephone number identifying a call origination point and a second telephone number identifying a call destination point;

receiving a vector call trajectory at said first node from the telecommunications network, the vector call trajectory comprising a plurality of vector segments defining a switch-to-switch pathway of said call between said call origination and destination points;

converting the vector call trajectory into a corresponding node-to-node billing trajectory bitmap;

identifying, at each node of said billing trajectory bitmap, which of the plurality of call carrier billing entities within a call billing segment associated with the node are being used and the associated call carrier costs;

alerting each of the nodes along the billing trajectory bitmap to generate a respective billable call segment for communication to a subsequently assigned call owner immediately upon receipt of a telephone call disconnect notification;

establishing ownership of the telephone call, at said first node, among said first, second and third tier groups;

assigning ownership of the call to a call owner node within one of said first, second and third tier groups;

receiving notification at the first node that the telephone call has disconnected; and merging the individual billing components at said assigned call owner node.

2. A method as recited in claim 1, further comprising, after the step of receiving a telephone call transaction request, the step of determining at said first node whether the call transaction comprises a billable connected call.

3. A method as recited in claim 1, further comprising, after the step of receiving notification at the first node that the telephone call has disconnected, the step of receiving acceptance of call ownership from the assigned call owner node.

4. A method as recited in claim 3, wherein the step of receiving notification at the first node that the telephone call has disconnected further comprises the call owner node transmitting a message to the informed nodes along the billing trajectory bitmap, the message including an unique system identifier corresponding to the telephone call transaction.

5. A method as recited in claim 4, wherein one or more Call Detail Records (CDRs) reflecting the actual costs of the billable call segments are generated by the network, the method further comprising, after the step of informing, the steps of:

comparing the billable call segments communicated to the assigned owner with said CDRs; and communicating a confirmation message to the assigned owner node confirming the accuracy of said billable call segments, the confirmation message including said unique system identifier.

6. A method as recited in claim 5, wherein the step of comparing the billable call segments further comprises identifying a cost differential between a billable segment cost communicated to said assigned owner node and a corresponding billable segment cost contained in said CDR, the method further comprising the steps of:

recalculating the billable call segment cost; and communicating the recalculated billable call segment cost to the call owner node.

7. A method as recited in claim 1, wherein the step of establishing ownership further comprises comparing the call destination point phone number to information contained in a look-up table maintained at said first node.

8. A method as recited in claim 7, wherein the step of establishing ownership further comprises assigning local telephone calls to said first tier group of nodes.

9. A method as recited in claim 7, wherein the step of establishing ownership further comprises assigning local long-distance telephone calls to said second tier group of nodes.

10. A method as recited in claim 7, wherein the step of establishing further comprises assigning long-distance and international telephone calls to said third tier group of nodes.

11. A method as recited in claim 1, further comprising, after the step of receiving notification at the first node that the call has disconnected, the step of assigning a unique system number, by each call owner node to each call, wherein the first several digits of the system number represent the hierarchical position of the respective call owner node within the system, and the remaining digits comprise a unique sequential number of the call owner node.

* * * * *